(12) United States Patent
Yoshimura et al.

(10) Patent No.: US 6,960,640 B2
(45) Date of Patent: Nov. 1, 2005

(54) COMPOSITION FOR OPTICAL MATERIAL

(75) Inventors: Yuichi Yoshimura, Mie (JP);
Motoharu Takeuchi, Tokyo (JP);
Kazumoto Nakagawa, Tokyo (JP)

(73) Assignee: Mitsubishi Gas Chemical Co., LTD., Tokyo (JP)

( * ) Notice: Subject to any disclaimer, the term of this patent is extended or adjusted under 35 U.S.C. 154(b) by 0 days.

(21) Appl. No.: 10/416,344

(22) PCT Filed: Aug. 27, 2002

(86) PCT No.: PCT/JP02/08607
§ 371 (c)(1),
(2), (4) Date: May 12, 2003

(87) PCT Pub. No.: WO03/020786
PCT Pub. Date: Mar. 13, 2003

(65) Prior Publication Data
US 2004/0147708 A1 Jul. 29, 2004

(30) Foreign Application Priority Data
Aug. 30, 2001 (JP) ................. 2001-262004

(51) Int. Cl.$^7$ ................. C08G 18/52
(52) U.S. Cl. ................. 528/73; 351/159
(58) Field of Search ................. 528/73; 351/159

(56) References Cited

U.S. PATENT DOCUMENTS

| 6,130,307 A | 10/2000 | Amagai et al. | |
| 2003/0149217 A1 * | 8/2003 | Bojkova et al. | ............... 528/75 |

FOREIGN PATENT DOCUMENTS

| EP | 936233 | * | 8/1999 |
| EP | 1 099 721 | | 5/2001 |
| GB | 1 447 500 | | 8/1976 |
| JP | 11-100428 | | 4/1999 |
| JP | 11-352302 | | 12/1999 |
| JP | 2000-256435 | | 9/2000 |
| JP | 2001-300943 | | 10/2001 |

OTHER PUBLICATIONS

International Search Report dated Dec. 10, 2002 for PCT/JP02/08607.
Communication and Supplementary European Search Report dated Sep. 27, 2004, for No. EP 02 76 5353.

* cited by examiner

Primary Examiner—Rachel Gorr
(74) Attorney, Agent, or Firm—Antonelli, Terry, Stout and Kraus, LLP.

(57) ABSTRACT

The composition for optical materials of the present invention comprises a compound having in one molecule at least one structure represented by the following formula (1):

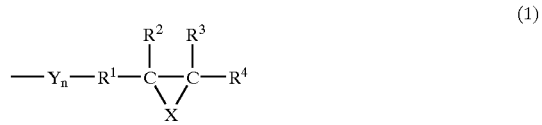

wherein $R^1$, $R^2$, $R^3$, $R^4$, X, Y and n are as defined in the disclosure, an amine compound and an isocyanate compound. Resins obtained by curing the composition by polymerization are useful as well-balanced optical materials having a high impact resistance, a high refractive index and a sufficiently high Abbe's number.

16 Claims, No Drawings

COMPOSITION FOR OPTICAL MATERIAL

TECHNICAL FIELD

The present invention relates to a resin composition suitable for producing optical materials such as plastic lens, prism, optical fiber, information recording medium, and filter, particularly, for producing a plastic spectacle lens, and further relates to the optical material produced by curing the resin composition by polymerization.

BACKGROUND ART

Plastic materials are recently widely used in manufacturing optical materials, particularly, spectacle lenses because of their light weight, toughness and easiness of dyeing. Optical materials, particularly, spectacle lenses are required to have a low specific gravity, a high transparency, a low yellow degree, a high impact resistance, and optical properties such as a high refractive index and a high Abbe's number.

Polycarbonate known as optical materials having a high impact resistance have some problems of (1) Abbe's number as low as 29, (2) ease of causing optical distortion, and (3) not so high refractive index as low as 1.58, etc.

Japanese Patent Application Laid-Open No. 3-236386 discloses a polythiourethane compound derived from a polythiol compound and an isocyanate group-containing compound. Although higher in the refractive index, the proposed polythiourethane compound is lower than polycarbonates in the impact resistance.

"Latest Polyurethane Applied Technology", CMC, pp89, 1983 discloses the production of a high-impact material by reacting a polyurethane prepolymer, which is prepared from an OH-terminated polymer and a diisocyanate, with an active hydrogen compound such as amines and polyols. The proposed material is higher in the impact resistance, but lower in the refractive index as compared with polycarbonates.

DISCLOSURE OF INVENTION

An object of the present invention is to provide well-balanced optical materials having a high impact resistance, a high refractive index and a sufficiently high Abbe's number, thereby decreasing the thickness of a lens.

As a result of extensive study for achieving the object, the inventors have found that a resin obtained by polymerizing a resin composition for optical materials comprising a compound (hereinafter referred to as "compound (a)) having in one molecule at least one structure represented by the following formula (1):

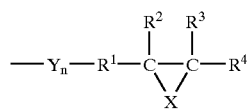

(1)

wherein $R^1$ is a single bond or a $C_1-C_{10}$ hydrocarbon group; each of $R^2$, $R^3$ and $R^4$ is a $C_1-C_{10}$ hydrocarbon group or hydrogen; X is S, O, Se or Te; Y is S, O, Se or Te; and n is an integer from 0 to 5,
an amine compound (hereinafter referred to as "compound (b)), and an isocyanate compound (hereinafter referred to as "compound (c)) is a well-balanced optical material having a high impact resistance, a high refractive index and a sufficiently high Abbe's number. The present invention has been accomplished on the basis of this finding.

Thus, in a first aspect of the present invention, there is provided a composition for optical materials comprising a compound having in one molecule at least one structure represented by the following formula (1):

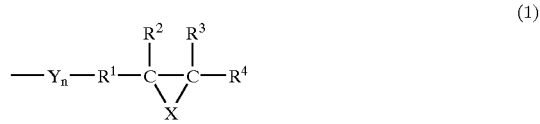

(1)

wherein $R^1$ is a single bond or a $C_1-C_{10}$ hydrocarbon group; each of $R^2$, $R^3$ and $R^4$ is a $C_1-C_{10}$ hydrocarbon group or hydrogen; X is S, O, Se or Te; Y is S, O, Se or Te; and n is an integer from 0 to 5,
an amine compound, and an isocyanate compound.

In a second aspect of the present invention, there is provided an optical material produced by curing the composition for optical materials by polymerization.

BEST MODE FOR CARRYING OUT THE INVENTION

Each proportion of the compound (a), the compound (b) and the compound (c) in the composition for resin varies depending on the refractive index or viscosity of each compound and the properties of the resulting resin. Each proportion is preferably selected from respective ranges of 0.5 to 90 parts by weight for the compound (a), 1 to 40 parts by weight for the compound (b), and 10 to 90 parts by weight for compound (c). If exceeding the above ranges, a high impact resistance intended by the present invention is not achieved. In addition, there occur several disadvantages such as insufficient heat resistance, discoloration of the cured product and failure in achieving one of the objects of the present invention, i.e., a high refractive index and a high Abbe's number. More preferably, the compound (a) is 3 to 70 parts by weight, the compound (b) is 3 to 30 parts by weight and the compound (c) is 20 to 85 parts by weight. Most preferably, the compound (a) is 5 to 50 parts by weight, the compound (b) is 5 to 20 parts by weight and the compound (c) is 40 to 80 parts by weight.

The Compound (a) includes compounds having in one molecule at least one structure represented by the following formula (1):

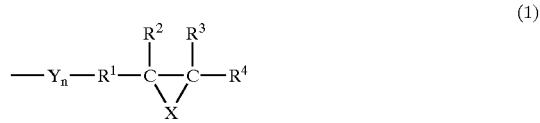

(1)

wherein $R^1$, $R^2$, $R^3$ $R^4$, X, Y and n are defined as above.

To achieve well-balanced high refractive index and high Abbe's number, $R^1$ is preferably methylene or ethylene, and $R^2$, $R^3$ and $R^4$ are each preferably hydrogen or methyl. More preferably, $R^1$ is methylene, and $R^2$, $R^3$ and $R^4$ are each hydrogen. The suffix n is an integer of 0 to 5, preferably an integer of 0 to 3, more preferably 1 or 2. X is S, O, Se or Te, preferably S, O or Se, and more preferably S or Se. Y is S, O, Se or Te, preferably S, O or Se, and more preferably S or Se.

The compound having in one molecule at least one structure represented by the formula (1) includes all organic compounds which meet such a requirement. A compound having in one molecule at least two structures of the formula (1) is preferable. Preferred examples of the compounds having in one molecule at least one structure of the formula (1) are the following epithio compounds (X=S). The episulfide compounds are classified into (A) to (E), and described in detail below.

(A) Organic compound having at least one epithio group
(B) Organic compound having at least one epithioalkyloxy group ($R^1$=hydrocarbon group, X=S, Y=O, n=1)
(C) Organic compound having at least one epithioalkylthio group ($R^1$=hydrocarbon group, X=S, Y=S, n=1)
(D) Organic compound having at least one epithioalkylseleno group ($R^1$=hydrocarbon group, X=S, Y=Se, n=1)
(E) Organic compound having at least one epithioalkyltelluro group ($R^1$=hydrocarbon group, X=S, Y=Te, n=1)

In addition to the epithio structure, each episulfide compound (A), (B), (C), (D) and (E) described above has, as the main backbone, aliphatic chain backbone, aliphatic branched backbone, alicyclic backbone, aromatic backbone, or hetero cyclic backbone containing a hetero atom such as nitrogen, oxygen, sulfur, selenium, and tellurium. The episulfide compound may have two or more groups selected from epithio group, epithioalkyloxy group, epithioalkylthio group, epithioalkylseleno group and epithioalkyltelluro group, simultaneously in one molecule. Further, these compounds may include linkage of sulfide, selenide, telluride, ether, sulfone, ketone, ester, amide, or urethane in the molecule.

Preferred examples of the episulfide compound (A) include compounds having an epoxy group (exclusive of glycidyl group) with its at least one epoxy group replaced by epithio group. Examples are described below.

A-1: Organic Compounds having Aliphatic Chain Backbone 1,1-bis(epithioethyl)methane, 1-(epithioethyl)-1-(β-epithiopropyl)methane, 1,1-bis(β-epithiopropyl)methane, 1-(epithioethyl)-1-(β-epithiopropyl)ethane, 1,2-bis(β-epithiopropyl)ethane, 1-(epithioethyl)-3-(β-epithiopropyl)butane, 1,3-bis(β-epithiopropyl)propane, 1-(epithioethyl)-4-(β-epithiopropyl)pentane, 1,4-bis(β-epithiopropyl)butane, 1-(epithioethyl)-5-(β-epithiopropyl)hexane, 1-(epithioethyl)-2-(γ-epithiobutylthio)ethane, 1-(epithioethyl)-2-[2-(γ-epithiobutylthio)ethylthio]ethane, tetrakis(β-epithiopropyl)methane, 1,1,1-tris(β-epithiopropyl)propane, 1,3-bis(β-epithiopropyl)-1-(β-epithiopropyl)-2-thiapropane, and 1,5-bis(β-epithiopropyl)-2,4-bis(β-epithiopropyl)-3-thiapentane;

A-2: Compounds having Alicyclic Backbone 1,3- or 1,4-bis(epithioethyl)cyclohexane, 1,3- or 1,4-bis(β-epithiopropyl)cyclohexane, bis[4-(epithioethyl)cyclohexyl]methane, bis[4-(β-epithiopropyl)cyclohexyl]methane, 2,2-bis[4-(epithioethyl)cyclohexyl]propane, 2,2-bis[4-(β-epithiopropyl)cyclohexyl]propane, bis[4-(β-epithiopropyl)cyclohexyl] sulfide, bis[4-(epithioethyl)cyclohexyl] sulfide, 2,5-bis(epithioethyl)-1,4-dithiane, 2,5-bis(β-epithiopropyl)-1,4-dithiane, 4-epithioethyl-1,2-cyclohexene sulfide, 4-epoxy-1,2-cyclohexene sulfide, 2,3-, 2,5- or 2,6-bis(1,2-epithioethyl)-1,4-diselenane, 2,3-, 2,5- or 2,6-bis(2,3-epithiopropyl)-1,4-diselenane, 2,4-, 2,5- or 2,6-bis(1,2-epithioethyl)-1,3-diselenane, 2,4-, 2,5- or 2,6-bis(2,4-epithiopropyl)-1,3-diselenane, 2,3-, 2,5-, 2,6- or 3,5-bis(1,2-epithioethyl)-1-thia-4-selenane, 2,3-, 2,5-, 2,6- or 3,5-bis(2,3-epithiopropyl)-1-thia-4-selenane, 2,4- or 4,5-bis(1,2-epithioethyl)-1,3-diselenolane, 2,4- or 4,5-bis(2,4-epithiopropyl)-1,3-diselenolane, 2,4-, 2,5- or 4,5-bis(1,2-epithioethyl)-1-thia-3-selenolane, 2,4-, 2,5- or 4,5-bis(2,4-epithiopropyl)-1-thia-3-selenolane, 2,3-, 2,4-, 2,5- or 3,4-bis(1,2-epithioethyl)selenophane, 2,3-, 2,4-, 2,5- or 3,4-bis(2,3-epithiopropyl)selenophane, 2,3-, 2,5-, or 2,6-bis(1,2-epithioethyl)-1,4-ditellurane, 2,3-, 2,5- or 2,6-bis(2,3-epithiopropyl)-1,4-ditellurane, 2,4-, 2,5- or 2,6-bis(1,2-epithioethyl)-1,3-ditellurane, 2,4-, 2,5- or 2,6-bis(2,4-epithiopropyl)-1,3-ditellurane, 2,3-, 2,5-, 2,6- or 3,5-bis(1,2-epithioethyl)-1-thia-4-tellurane, 2,3-, 2,5-, 2,6- or 3,5-bis(2,3-epithiopropyl)-1-thia-4-tellurane, 2,4- or 4,5-bis(1,2-epithioethyl)-1,3-ditellurolane, 2,4- or 4,5-bis(2,4-epithiopropyl)-1,3-ditellurolane, 2,4-, 2,5- or 4,5-bis(1,2-epithioethyl) 1-thia-3-tellurolane, 2,4-, 2,5- or 4,5-bis(2,4-epithiopropyl)-1-thia-3-tellurolane, 2,3-, 2,4-, 2,5- or 3,4-bis(1,2-epithioethyl)tellurophane, and 2,3-, 2,4-, 2,5- or 3,4-bis(2,3-epithiopropyl)tellurophane;

A-3: Compounds having Aromatic Backbone 1,3- or 1,4-bis(epithioethyl)benzene, 1,3- or 1,4-bis(β-epithiopropyl)benzene, bis[4-(epithioethyl)phenyl]methane, bis[4-(β-epithiopropyl)phenyl] methane, 2,2-bis[4-(epithioethyl)phenyl]propane, 2,2-bis[4-(β-epithiopropyl)phenyl]propane, bis[4-(epithioethyl)phenyl] sulfide, bis[4-(β-epithiopropyl)phenyl] sulfide, bis[4-(epithioethyl)phenyl] sulfone, bis[4-(β-epithiopropyl)phenyl] sulfone, 4,4'-bis(epithioethyl)biphenyl, and 4,4'-bis(β-epithiopropyl)biphenyl; and compounds obtained by replacing at least one hydrogen of the epithio group in the above compounds with methyl.

Preferred examples of the episulfide compound (B) include compounds derived from an epihalohydrin, with its at least one glycidyl group replaced by epithioalkyloxy group (thioglycidyl group). Examples of the epoxy compounds include:

phenolic epoxy compounds prepared by condensing an epihalohydrin with a polyhydric phenol compounds such as hydroquinone, catechol, resorcinol, bisphenol A, bisphenol F, bisphenol sulfone, bisphenol ether, bisphenol sulfide, halogenated bisphenol A and novolak resins;

alcoholic epoxy compounds prepared by condensing an epihalohydrin with a polyhydric alcoholic compounds such as ethylene glycol, diethylene glycol, triethylene glycol, polyethylene glycol, propylene glycol, dipropylene glycol, polypropylene glycol, 1,3-propanediol, 1,4-butanediol, 1,6-hexanediol, neopentyl glycol, glycerol, trimethylolpropane trimethacrylate, pentaerythritol, 1,3- or 1,4-cyclohexanediol, 1,3- or 1,4-cyclohexanedimethanol, 3-selenaheptane-1,5-diol, 2,5-bis(hydroxymethyl) selenophane, 2,5-bis(4-hydroxy-2-selenabutyl) selenophane, 2,6-dihydroxymethyl-1,4-diselenane, 3,5-dihydroxymethyl-1-thia-4-selenane, 3-tellenaheptane-1,5-diol, 2,5-bis(hydroxymethyl) tellurophane, 2,5-bis(4-hydroxy-2-tellenabutyl) tellurophane, 2,6-dihydroxymethyl-1,4-ditellurane, 3,5-dihydroxymethyl-1-thia-4-tellurane, hydrogenated bisphenol A, bisphenol A/ethylene oxide adducts, and bisphenol A/propylene oxide adducts;

glycidyl ester epoxy compounds prepared by condensing an epihalohydrin with a polybasic carboxylic acid such as adipic acid, sebacic acid, dodecandicarboxylic acid, dimer acid, phthalic acid, isoterephthalic acid, tetrahydrophthalic acid, methyltetrahydrophthalic acid, hexahydrophthalic acid, hexahydroisophthalic acid, hexahydroterephthalic acid, HET acid, nadic acid, maleic acid, succinic acid, fumaric acid, trimellitic acid, benzenetetracarboxylic acid, benzophenonetetracarboxylic acid, naphthalenedicarboxylic acid and diphenyldicarboxylic acid;

amine epoxy compounds prepared by condensing an epihalohydrin with a primary diamine such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl) ether, 1,2-bis(3-aminopropoxy)ethane, 1,3-bis(3-aminopropoxy)-2,2'-dimethylpropane, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, isophoronediamine, 1,4-bisaminopropylpiperadine, m- or p-phenylenediamine, 2,4- or 2,6-tolylenediamine, n- or p-xylylenediamine, 1,5- or 2,6-naphthalenediamine, 4,4'-diaminodiphenylmethane, 4,4'-diaminodiphenyl ether and 2,2-(4,4'-diaminodiphenyl)propane;

amine epoxy compounds prepared by condensing an epihalohydrin with a secondary diamine such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- or 2,6-dimethylpiperadine, homopiperadine, 1,1-di(4-piperidyl)methane, 1,2-di(4-piperidyl)ethane, 1,3-di(4-piperidyl)propane, and 1,4-di(4-piperidyl)butane; and urethane epoxy compounds produced by the reaction of the above polyhydric alcohol compounds or phenol compounds with diisocyanate compounds and glycidol.

Examples of the episulfide compound (B) are described below.

B-1: Organic Compounds having Aliphatic Chain Backbone bis(β-epithiopropyl) ether, bis(β-epithiopropyloxy)methane, 1,2-bis(β-epithiopropyloxy)ethane, 1,3-bis(β-epithiopropyloxy)propane, 1,2-bis(β-epithiopropyloxy)propane, 1-(β-epithiopropyloxy)-2-(β-epithiopropyloxymethyl)propane, 1,4-bis(β-epithiopropyloxy)butane, 1,3-bis(β-epithiopropyloxy)butane, 1-(β-epithiopropyloxy)-3-(β-epithiopropyloxymethyl)butane, 1,5-bis(β-epithiopropyloxy)pentane, 1-(β-epithiopropyloxy)-4-(β-epithiopropyloxymethyl)pentane, 1,6-bis(β-epithiopropyloxy)hexane, 1-(β-epithiopropyloxy)-5-(β-epithiopropyloxymethyl)hexane, 1-(β-epithiopropyloxy)-2-[(2-β-epithiopropyloxyethyl)oxy]ethane, 1-(β-epithiopropyloxy)-2-[[2-(2-β-epithiopropyloxyethyl)oxyethyl]oxy]ethane, bis(5,6-epithio-3-oxahexyl) selenide, bis(5,6-epithio-3-oxahexyl) telluride, tetrakis(β-epithiopropyloxymethyl)methane, 1,1,1-tris(β-epithiopropyloxymethyl)propane, 1,5-bis(β-epithiopropyloxy)-2-(β-epithiopropyloxymethyl)-3-thiapentane, 1,5-bis(β-epithiopropyloxy)-2,4-bis(β-epithiopropyloxymethyl)-3-thiapentane, 1-(β-epithiopropyloxy)-2,2-bis(β-epithiopropyloxymethyl)-4-thiahexane, 1,5,6-tris(β-epithiopropyloxy)-4-(β-epithiopropyloxymethyl)-3-thiahexane, 1,8-bis(β-epithiopropyloxy)-4-(β-epithiopropyloxymethyl)-3,6-dithiaoctane, 1,8-bis(β-epithiopropyloxy)-4,5-bis(β-epithiopropyloxymethyl)-3,6-dithiaoctane, 1,8-bis(β-epithiopropyloxy)-4,4-bis(β-epithiopropyloxymethyl)-3,6-dithiaoctane, 1,8-bis(β-epithiopropyloxy)-2,4,5-tris(β-epithiopropyloxymethyl)-3,6-dithiaoctane, 1,8-bis(β-epithiopropyloxy)-2,5-bis(β-epithiopropyloxymethyl)-3,6-dithiaoctane, 1,9-bis(β-epithiopropyloxy)-5-(β-epithiopropyloxymethyl)-5-[(2-β-epithiopropyloxyethyl)oxymethyl]-3,7-dithianonane, 1,10-bis(β-epithiopropyloxy)-5,6-bis[(2-β-epithiopropyloxyethyl)oxy]-3,6,9-trithiadecane, 1,11-bis(β-epithiopropyloxy)-4,8-bis(β-epithiopropyloxymethyl)-3,6,9-trithiaundecane, 1,11-bis(P-epithiopropyloxy)-5,7-bis(β-epithiopropyloxymethyl)-3,6,9-trithiaundecane, 1,11-bis(β-epithiopropyloxy)-5,7-[(2-β-epithiopropyloxyethyl)oxymethyl]-3,6,9-trithiaundecane, and 1,11-bis(β-epithiopropyloxy)-4,7-bis(β-epithiopropyloxymethyl)-3,6,9-trithiaundecane;

B-2: Compounds having Alicyclic Backbone 1,3- or 1,4-bis(β-epithiopropyloxy)cyclohexane, 1,3- or 1,4-bis(β-epithiopropyloxymethyl)cyclohexane, bis[4-(β-epithiopropyloxy)cyclohexyl]methane, 2,2-bis[4-(β-epithiopropyloxy)cyclohexyl]propane, bis[4-(β-epithiopropyloxy)cyclohexyl] sulfide, 2,5-bis(β-epithiopropyloxymethyl)-1,4-dithiane, 2,5-bis(β-epithiopropyloxyethyloxymethyl)-1,4-dithiane, 2,4- or 4,5-bis(3,4-epithio-1-oxabutyl)-1,3-diselenolane, 2,4- or 4,5-bis(4,5-epithio-2-oxapentyl)-1,3-diselenolane, 2,4-, 2,5- or 4,5-bis(3,4-epithio-1-oxabutyl)-1-thia-3-selenolane, 2,4-, 2,5- or 4,5-bis(4,5-epithio-2-oxapentyl)-1-thia-3-selenolane, bis(3,4-epithio-1-oxabutyl)tricycloselenaoctane, bis(3,4-epithio-1-oxabutyl)dicycloselenanonane, 2,3-, 2,4-, 2,5- or 3,4-bis(3,4-epithio-1-oxabutyl)selenophane, 2,3-, 2,4-, 2,5- or 3,4-bis(4,5-epithio-2-oxapentyl)selenophane, 2,3-, 2,5- or 2,6-bis(3,4-epithio-1-oxabutyl)-1,4-diselenane, 2,3-, 2,5- or 2,6-bis(4,5-epithio-2-oxapenyyl)-1,4-diselenane, 2,4-, 2,5- or 2,6-bis(3,4-epithio-1-oxabutyl)-1,3-diselenane, 2,4-, 2,5- or 2,6-bis(4,5-epithio-2-oxapentyl)-1,3-diselenane, 2,3-, 2,5-, 2,6- or 3,5-bis(3,4-epithio-1-oxabutyl)-1-thia-4-selenane, 2,3-, 2,5-, 2,6- or 3,5-bis(4,5-epithio-2-oxapentyl)-1-thia-4-selenane, 2,4- or 4,5-bis(3,4-epithio-1-oxabutyl)-1,3-ditellurolane, 2,4- or 4,5-bis(4,5-epithio-2-oxapentyl)-1,3-ditellurolane, 2,4-, 2,5- or 4,5-bis(3,4-epithio-1-oxabutyl)-1-thia-3-tellurolane, 2,4-, 2,5- or 4,5-bis(4,5-epithio-2-oxapentyl)-1-thia-3-tellurolane, bis(3,4-epithio-1-oxabutyl)tricyclotelluraoctane, bis(3,4-epithio-1-oxabutyl)dicyclotelluranonane, 2,3-, 2,4-, 2,5- or 3,4-bis(3,4-epithio-1-oxabutyl)tellurophane, 2,3-, 2,4-, 2,5- or 3,4-bis(4,5-epitho-2-oxapentyl)tellurophane, 2,3-, 2,5- or 2,6-bis(3,4-epithio-1-oxabutyl)-1,4-ditellurane, 2,3-, 2,5- or 2,6-bis(4,5-epithio-2-oxapentyl)-1,4-ditellurane, 2,4-, 2,5- or 2,6-bis(3,4-epithio-1-oxabutyl)-1,3-ditellurane, 2,4-, 2,5- or 2,6-bis(4,5-epithio-2-oxapentyl)-1,3-ditellurane, 2,3-, 2,5-, 2,6- or 3,5-bis(3,4-epithio-1-oxabutyl)-1-thia-4-tellurane, and 2,3-, 2,5-, 2,6- or 3,5-bis(4,5-epithio-2-oxapentyl)-1-thia-4-tellurane;

B-3: Compounds having Aromatic Backbone 1,3- or 1,4-bis(β-epithiopropyloxy)benzene, 1,3- or 1,4-bis(β-epithiopropyloxymethyl)benzene, bis[4-(η-epithiopropyl)phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfone, and 4,4'-bis(β-epithiopropylthio)biphenyl; and compounds obtained by replacing at least one hydrogen of the epithio group in the above compounds with methyl.

Preferred examples of the episulfide compound (C) include epoxy compounds derived from a mercapto compound and an epihalohydrin, with its at least one epoxyalkylthio group (particularly, β-epoxypropylthio group) replaced by an epithioalkylthio group. Examples of the episulfide compound (C) are described below.

C-1: Organic Compounds having Aliphatic Chain Backbone bis(epithioethyl) sulfide, bis(epithioethyl) disulfide, bis(epithioethyl) trisulfide, bis(β-epithiopropyl) sulfide, bis(β-epithiopropyl) disulfide, bis(β-epithiopropyl) trisulfide, bis (β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[[2-(2-β-epithiopropylthioethyl)thioethyl]thio]ethane, tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis[(2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)thiomethyl]-3,6,9-trithiaundecane, 1,11-bis(β-epithiopropylthio)-4,7-bis(β-epithiopropylthiomethyl)-3,6,9-trithiaundecane, tetra[2-(β-epithiopropylthio)acetylmethyl]methane, 1,1,1-tri[2-(β-epithiopropylthio)acetylmethyl]propane, tetra[2-(β-epithiopropylthiomethyl)acetylmethyl]methane, 1,1,1-tri[2-(β-epithiopropylthiomethyl)acetylmethyl]propane, bis(5,6-epithio-3-thiahexyl)selenide, 2,3-bis(6,7-thioepoxy-1-selena-4-thiaheptyl)-1-(3,4-thioepoxy-1-thiabutyl)propane, 1,1,3,3-tetrakis(4,5-thioepoxy-2-thiapentyl)-2-selenapropane, bis(4,5-thioepoxy-2-thiapentyl)-3,6,9-triselenaundecane-1,11-bis(3,4-thioepoxy-1-thiabutyl), 1,4-bis(3,4-thioepoxy-1-thiabutyl)-2,3-bis(6,7-thioepoxy-1-selena-4-thiaheptyl)butane, tris(4,5-thioepoxy-2-thiapentyl)-3-selena-6-thiaoctane-1,8-bis(3,4-thioepoxy-1-thiabutyl), bis(5,6-epithio-3-thiahexyl) telluride, 2,3-bis(6,7-thioepoxy-1-tellura-4-thiaheptyl)-1-(3,4-thioepoxy-1-thiabutyl)propane, 1,1,3,3-tetrakis(4,5-thioepoxy-2-thiapentyl)-2-tellurapropane, bis(4,5-thioepoxy-2-thiapentyl)-3,6,9-tritelleraundecane-1,11-bis(3,4-thioepoxy-1-thiabutyl), 1,4-bis(3,4-thioepoxy-1-thiabutyl)-2,3-bis(6,7-thioepoxy-1-tellura-4-thiaheptyl)butane, and tris(4,5-thioepoxy-2-thiapentyl)-3-tellura-6-thiaoctane-1,8-bis(3,4-thioepoxy-1-thiabutyl);

C-2: Compounds having Alicyclic Backbone 1,3- or 1,4-bis(β-epithiopropylthio)cyclohexane, 1,3- or 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, bis[4-(β-epithiopropylthio)cyclohexyl] sulfide, 2,5-bis(β-epithiopropylthiomethyl)-1,4-dithiane, 2,5-bis(β-epithiopropylthioethylthiomethyl)-1,4-dithiane, 2,3-, 2,5- or 2,6-bis(3,4-epithio-1-thiabutyl)-1,4-diselenane, 2,3-, 2,5- or 2,6-bis(4,5-epithio-2-thiapentyl)-1,4-diselenane, 2,4-, 2,5- or 5,6-bis(3,4-epithio-1-thiabutyl)-1,3-diselenane, 2,4-, 2,5- or 5,6-bis(4,5-epithio-2-thiapentyl)-1,3-diselenane, 2,3-, 2,5-, 2,6- or 3,5-bis(3,4-epithio-1-thiabutyl)-1-thia-4-selenane, 2,3-, 2,5-, 2,6- or 3,5-bis(4,5-epithio-2-thiapentyl)-1-thia-4-selenane, 2,4- or 4,5-bis(3,4-epithio-1-thiabutyl)-1,3-diselenolane, 2,4- or 4,5-bis(4,5-epithio-2-thiapentyl)-1,3-diselenolane, 2,4-, 2,5- or 4,5-bis(3,4-epithio-1-thiabutyl)-1-thia-3-selenolane, 2,4-, 2,5- or 4,5-bis(4,5-epithio-2-thiapentyl)-1-thia-3-selenolane, 2,6-bis(4,5-epithio-2-thiapentyl)-1,3,5-triselenane, bis(3,4-epithio-1-thiabutyl)tricycloselenaoctane, bis(3,4-epithio-1-thiabutyl)dicycloselenanonane, 2,3-, 2,4-, 2,5- or 3,4-bis(3,4-epithio-1-thiabutyl)selenophane, 2,3-, 2,4-, 2,5- or 3,4-bis(4,5-epithio-2-thiapentyl)selenophane, 2-(4,5-thioepoxy-2-thiapentyl)-5-(3,4-thioepoxy-1-thiabutyl)-1-selenacyclohexane, 2,3-, 2,4-, 2,5-, 2,6-, 3,4-, 3,5- or 4,5-bis(3,4-epoxy-1-thiabutyl)-1-selenacyclohexane, 2,3-, 2,4-, 2,5-, 2,6-, 3,4-, 3,5- or 4,5-bis(4,5-thioepoxy-2-thiapentyl)-1-selenacyclohexane, 2,3-, 2,5- or 2,6-bis(3,4-epithio-1-thiabutyl)-1,4-ditellurane, 2,3-, 2,5- or 2,6-bis(4,5-epithio-2-thiapentyl)-1,4-ditellurane, 2,4-, 2,5- or 5,6-bis(3,4-epithio-1-thiabutyl)-1,3-ditellurane, 2,4-, 2,5- or 5,6-bis(4,5-epithio-2-thiapentyl)-1,3-ditellurane, 2,3-, 2,5-, 2,6- or 3,5-bis(3,4-epithio-1-thiabutyl)-1-thia-4-tellurane, 2,3-, 2,5-, 2,6- or 3,5-bis(4,5-epithio-2-thiapentyl)-1-thia-4-tellurane, 2,4- or 4,5-bis(3,4-epithio-1-thiabutyl)-1,3-ditellurolane, 2,4- or 4,5-bis(4,5-epithio-2-thiapentyl)-1,3-ditellurolane, 2,4-, 2,5- or 4,5-bis(3,4-epithio-1-thiabutyl)-1-thia-3-tellurolane, 2,4-, 2,5- or 4,5-bis(4,5-epithio-2-thiapentyl)-1-thia-3-tellurolane, 2,6-bis(4,5-epithio-2-thiapentyl)-1,3,5-tritellurane, bis(3,4-epithio-1-thiabutyl)tricyclotelluraoctane, bis(3,4-epithio-1-thiabutyl)dicycloteluranonane, 2,3-, 2,4-, 2,5- or 3,4-bis(3,4-epithio-1-thiabutyl)tellurophane, 2,3-, 2,4-, 2,5- or 3,4-bis(4,5-epithio-2-thiapentyl)tellurophane, 2-(4,5-thioepoxy-2-thiapentyl)-5-(3,4-thioepoxy-1-thiabutyl)-1-telluracyclohexane, 2,3-, 2,4-, 2,5-, 2,6-, 3,4-, 3,5- or 4,5-bis(3,4-thioepoxy-1-thiabutyl)-1-telluracyclohexane, and 2,3-, 2,4-, 2,5-, 2,6-, 3,4-, 3,5- or 4,5-bis(4,5-thioepoxy-2-thiapentyl)-1-telluracyclohexane;

C-3: Compounds having Aromatic Backbone 1,3- or 1,4-bis(β-epithiopropylthio)benzene, 1,3- or 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl] sulfide, bis[4-(β-epithiopropylthio)phenyl] sulfone, and 4,4'-bis(β-epithiopropylthio)biphenyl; and compounds obtained by replacing at least one hydrogen of the β-epithiopropyl group in the above compounds with methyl.

Preferred examples of the episulfide compound (D) include epoxy compounds derived from an epihalohydrin and a selenium compound such as alkali metal selenide, alkali metal selenol, alkyl(aryl) selenol, and hydrogen selenide, with its at least one epoxyalkylseleno group (particularly, β-epoxypropylseleno group) replaced by an epithioalkylseleno group. Examples of the episulfide compounds (D) are described below.

D-1: Organic Compounds having Aliphatic Chain Backbone bis(epithioethyl) selenide, bis(epithioethly) diselenide, bis(epithioethly) triselenide, bis(β-epithiopropyl) selenide, bis(β-epithiopropyl) diselenide, bis(β-epithiopropyl)

triselenide, bis(β-epithiopropylseleno)methane, 1,2-bis(β-epithiopropylseleno)ethane, 1,3-bis(β-epithiopropylseleno)propane, 1,2-bis(β-epithiopropylseleno)propane, 1-(β-epithiopropylseleno)-2-(β-epithiopropylselenomethyl)propane, 1,4-bis(β-epithiopropylseleno)butane, 1,3-bis(β-epithiopropylseleno)butane, 1-(β-epithiopropylseleno)-3-(β-epithiopropylselenomethyl)butane, 1,5-bis(β-epithiopropylseleno)pentane, 1-(β-epithiopropylseleno)-4-(β-epithiopropylselenomethyl)pentane, 1,6-bis(β-epithiopropylseleno)hexane, 1-(β-epithiopropylseleno)-5-(β-epithiopropylselenomethyl)hexane, 1-(β-epithiopropylseleno)-2-[(2-β-epithiopropylselenoethyl)thio]ethane, 1-(β-epithiopropylseleno)-2-[[2-(2-β-epithiopropylselenoethyl)selenoethyl]thio]ethane, tetrakis(β-epithiopropylselenomethyl)methane, 1,1,1-tris(β-epithiopropylselenomethyl)propane, 1,5-bis(β-epithiopropylseleno)-2-(β-epithiopropylselenomethyl)-3-thiapentane, 1,5-bis(β-epithiopropylseleno)-2,4-bis(β-epithiopropylselenomethyl)-3-thiapentane, 1-(β-epithiopropylseleno)-2,2-bis(β-epithiopropylselenomethyl)-4-thiahexane, 1,5,6-tris(β-epithiopropylseleno)-4-(β-epithiopropylselenomethyl)-3-thiahexane, 1,8-bis(β-epithiopropylseleno)-4-(β-epithiopropylselenomethyl)-3,6-dithiaoctane, 1,8-bis(β-epithiopropylseleno)-4,5-bis(β-epithiopropylselenomethyl)-3,6-dithiaoctane, 1,8-bis(β-epithiopropylseleno)-4,4-bis(β-epithiopropylselenomethyl)-3,6-dithiaoctane, 1,8-bis(β-epithiopropylseleno)-2,4,5-tris(β-epithiopropylselenomethyl)-3,6-dithiaoctane, 1,8-bis(β-epithiopropylseleno)-2,5-bis(β-epithiopropylselenomethyl)-3,6-dithiaoctane, 1,9-bis(β-epithiopropylseleno)-5-(β-epithiopropylselenomethyl)-5-[(2-β-epithiopropylselenoethyl)selenomethyl]-3,7-dithianonane, 1,10-bis(β-epithiopropylseleno)-5,6-bis[(2-β-epithiopropylselenoethyl)thio]-3,6,9-trithiadecane, 1,11-bis(β-epithiopropylseleno)-4,8-bis(β-epithiopropylselenomethyl)-3,6,9-trithiaundecane, 1,11-bis(β-epithiopropylseleno)-5,7-bis(β-epithiopropylselenomethyl)-3,6,9-trithiaundecane, 1,11-bis(β-epithiopropylseleno)-5,7-[(2-β-epithiopropylselenoethyl)selenomethyl]-3,6,9-trithiaundecane, 1,11-bis(β-epithiopropylseleno)-4,7-bis(β-epithiopropylselenomethyl)-3,6,9-trithiaundecane, tetra[2-(β-epithiopropylseleno)acetylmethyl]methane, 1,1,1-tri[2-(β-epithiopropylseleno)acetylmethyl]propane, tetra[2-(β-epithiopropylselenomethyl)acetylmethyl]methane, 1,1,1-tri[2-(β-epithiopropylselenomethyl)acetylmethyl]propane, bis(5,6-epithio-3-selenohexyl) selenide, 2,3-bis(6,7-thioepoxy-1-selena-4-selenoheptyl)-1-(3,4-thioepoxy-1-selenobutyl)propane, 1,1,3,3-tetrakis(4,5-thioepoxy-2-selenopentyl)-2-selenapropane, bis(4,5-thioepoxy-2-selenopentyl)-3,6,9-triselenaundecane-1,11-bis(3,4-thioepoxy-1-selenobutyl), 1,4-bis(3,4-thioepoxy-1-selenobutyl)-2,3-bis(6,7-thioepoxy-1-selena-4-selenoheptyl)butane, tris(4,5-thioepoxy-2-selenopentyl)-3-selena-6-thiaoctane-1,8-bis(3,4-thioepoxy-1-selenobutyl), bis(5,6-epithio-3-selenohexyl) telluride, 2,3-bis(6,7-thioepoxy-1-tellura-4-selenoheptyl)-1-(3,4-thioepoxy-1-selenobutyl)propane, 1,1,3,3-tetrakis(4,5-thioepoxy-2-selenopentyl)-2-tellurapropane, bis(4,5-thioepoxy-2-selenopentyl)-3,6,9-tritelleraundecane-1,11-bis(3,4-thioepoxy-1-selenobutyl), 1,4-bis(3,4-thioepoxy-1-selenobutyl)-2,3-bis(6,7-thioepoxy-1-tellura-4-selenoheptyl)butane, and tris(4,5-thiepoxy-2-selenopentyl)-3-tellura-6-thiaoctane-1,8-bis(3,4-thioepoxy-1-selenobutyl);

D-2: Compounds having Alicyclic Backbone 1,3- or 1,4-bis(β-epithiopropylseleno)cyclohexane, 1,3- or 1,4-bis(β-epithiopropylselenomethyl)cyclohexane, bis[4-(β-epithiopropylseleno)cyclohexyl]methane, 2,2-bis[4-(β-epithiopropylseleno)cyclohexyl]propane, bis[4-(β-epithiopropylseleno)cyclohexyl] sulfide, 2,5-bis(β-epithiopropylselenomethyl)-1,4-dithiane, 2,5-bis(β-epithiopropylselenoethylthiomethyl)-1,4-dithiane, 2,3-, 2,5- or 2,6-bis(3,4-epithio-1-selenobutyl)-1,4-diselenane, 2,3-, 2,5- or 2,6-bis(4,5-epithio-2-selenopentyl)-1,4-diselenane, 2,4-, 2,5- or 5,6-bis(3,4-epithio-1-selenobutyl)-1,3-diselenane, 2,4-, 2,5- or 5,6-bis(4,5-epithio-2-selenopentyl)-1,3-diselenane, 2,3-, 2,5-, 2,6- or 3,5-bis(3,4-epithio-1-selenobutyl)-1-thia-4-selenane, 2,3-, 2,5-, 2,6- or 3,5-bis(4,5-epithio-2-selenopentyl)-1-thia-4-selenane, 2,4- or 4,5-bis(3,4-epithio-1-selenobutyl)-1,3-diselenolane, 2,4- or 4,5-bis(4,5-epithio-2-selenopentyl)-1,3-diselenolane, 2,4-, 2,5- or 4,5-bis(3,4-epithio-1-selenobutyl)-1-thia-3-selenolane, 2,4-, 2,5- or 4,5-bis(4,5-epithio-2-selenopentyl)-1-thia-3-selenolane, 2,6-bis(4,5-epithio-2-selenopentyl)-1,3,5-triselenane, bis(3,4-epithio-1-selenobutyl)tricycloselenaoctane, bis(3,4-epithio-1-selenobutyl)dicycloselenanonane, 2,3-, 2,4-, 2,5- or 3,4-bis(3,4-epithio-1-selenobutyl)selenophane, 2,3-, 2,4-, 2,5-, 3,4-bis(4,5-epithio-2-selenopentyl)selenophane, 2-(4,5-thioepoxy-2-selenopentyl)-5-(3,4-thioepoxy-1-selenobutyl)-1-selenacyclohexane, 2,3-, 2,4-, 2,5-, 2,6-, 3,4-, 3,5- or 4,5-bis(3,4-thioepoxy-1-selenobutyl)-1-selenacyclohexane, 2,3-, 2,4-, 2,5-, 2,6-, 3,4-, 3,5- or 4,5-bis(4,5-thioepoxy-2-selenopentyl)-1-selenacyclohexane, 2,3-, 2,5- or 2,6-bis(3,4-epithio-1-selenobutyl)-1,4-ditellurane, 2,3-, 2,5- or 2,6-bis(4,5-epithio-2-selenopentyl)-1,4-ditellurane, 2,4-, 2,5- or 5,6-bis(3,4-epithio-1-selenobutyl)-1,3-ditellurane, 2,4-, 2,5- or 5,6-bis(4,5-epithio-2-selenopentyl)-1,3-ditellurane, 2,3-, 2,5-, 2,6- or 3,5-bis(3,4-epithio-1-selenobutyl)-1-thia-4-tellurane, 2,3-, 2,5-, 2,6- or 3,5-bis(4,5-epithio-2-selenopentyl)-1-thia-4-tellurane, 2,4- or 4,5-bis(3,4-epithio-1-selenobutyl)-1,3-ditellurolane, 2,4- or 4,5-bis(4,5-epithio-2-selenopentyl)-1,3-ditellurolane, 2,4-, 2,5- or 4,5-bis(3,4-epithio-1-selenobutyl)-1-thia-3-telluroane, 2,4-, 2,5- or 4,5-bis(4,5-epithio-2-selenopentyl)-1-thia-3-tellurolane, 2,6-bis(4,5-epithio-2-selenopentyl)-1,3,5-tritellurane, bis(3,4-epithio-1-selenobutyl)tricycloteleruaoctane, bis(3,4-epithio-1-selenobutyl)dicycloteleluranonane, 2,3-, 2,4-, 2,5- or 3,4-bis(3,4-epithio-1-selenobutyl)tellurophane, 2,3-, 2,4-, 2,5- or 3,4-bis(4,5-epithio-2-selenopentyl)tellurophane, 2-(4,5-thioepoxy-2-selenopentyl)-5-(3,4-thioepoxy-1-selenobutyl)-1-telluracyclohexane, 2,3-, 2,4-, 2,5-, 2,6-, 3,4-, 3,5- or 4,5-bis(3,4-thioepoxy-1-selenobutyl)-1-telluracyclohexane, and 2,3-, 2,4-, 2,5-, 2,6-, 3,4-, 3,5- or 4,5-bis(4,5-thioepoxy-2-selenopentyl)-1-telluracyclohexane;

D-3: Compounds having Aromatic Backbone 1,3- or 1,4-bis(β-epithiopropylseleno)benzene, 1,3- or 1,4-bis(β-epithiopropylselenomethyl)benzene, bis[4-(β-epithiopropylseleno)phenyl]methane, 2,2-bis[4-(β-epithiopropylseleno)phenyl]propane, bis[4-(β-epithiopropylseleno)phenyl] sulfide, bis[4-(β-epithiopropylseleno)phenyl] sulfone, and 4,4'-bis(β-epithiopropylseleno)biphenyl; and compounds obtained by replacing at least one hydrogen of the β-epithiopropyl group in the above compounds with methyl.

Preferred examples of the episulfide compound (E) include epoxy compounds derived from an epihalohydrins and a tellurium compound such as alkali metal telluride, alkali metal tellurol, alkyl(aryl) tellurol, and hydrogen telluride, with its at least one epoxyalkyltelluro group (particularly, β-epoxypropyltelluro group) replaced by an epithioalkyltelluro group. Examples of the episulfide compounds (E) are described below.

E-1: Organic Compounds having Aliphatic Chain Backbone bis(epithioethyl) telluride, bis(epithioethyl) ditelluride, bis(epithioethyl) tritelluride, bis(β-epithiopropyl) telluride, bis(β-epidithiopropyl) telluride, bis(β-epithiopropyl) ditelluride, bis(β-epidithiopropyl) ditelluride, bis(β-epithiopropyl) tritelluride, bis(β-epithiopropyltelluro) methane, 1,2-bis(β-epithiopropyltelluro)ethane, 1,3-bis(β-epithiopropyltelluro)propane, 1,2-bis(β-epithiopropyltelluro)propane, 1-(β-epithiopropyltelluro)-2-(β-epithiopropyltelluromethyl)propane, 1,4-bis(β-epithiopropyltelluro)butane, 1,3-bis(β-epithiopropyltelluro)butane, 1-(β-epithiopropyltelluro)-3-(β-epithiopropyltelluromethyl)butane, 1,5-bis(β-epithiopropyltelluro)pentane, 1-(β-epithiopropyltelluro)-4-(β-epithiopropyltelluromethyl)pentane, 1,6-bis(β-epithiopropyltelluro)hexane, 1-(β-epithiopropyltelluro)-5-(β-epithiopropyltelluromethyl)hexane, 1-(β-epithiopropyltelluro)-2-[(2-β-epithiopropyltelluroethyl)thio]ethane, 1-(β-epithiopropyltelluro)-2-[[2-(2-β-epithiopropyltelluroethyl)telluroethyl]thio]ethane, tetrakis(β-epithiopropyltelluromethyl)methane, 1,1,1-tris(β-epithiopropyltelluromethyl)propane, 1,5-bis(β-epithiopropyltelluro)-2-(β-epithiopropyltelluromethyl)-3-thiapentane, 1,5-bis(β-epithiopropyltelluro)-2,4-bis(β-epithiopropyltelluromethyl)-3-thiapentane, 1-(β-epithiopropyltelluro)-2,2-bis(β-epithiopropyltelluromethyl)-4-thiahexane, 1,5,6-tris(β-epithiopropyltelluro)-4-(β-epithiopropyltelluromethyl)-3-thiahexane, 1,8-bis(β-epithiopropyltelluro)-4-(β-epithiopropyltelluromethyl)-3,6-dithiaoctane, 1,8-bis(β-epithiopropyltelluro)-4,5-bis(β-epithiopropyltelluromethyl)-3,6-dithiaoctane, 1,8-bis(β-epithiopropyltelluro)-4,4-bis(β-epithiopropyltelluromethyl)-3,6-dithiaoctane, 1,8-bis(β-epithiopropyltelluro)-2,4,5-tris(β-epithiopropyltelluromethyl)-3,6-dithiaoctane, 1,8-bis(β-epithiopropyltelluro)-2,5-bis(β-epithiopropyltelluromethyl)-3,6-dithiaoctane, 1,9-bis(β-epithiopropyltelluro)-5-(β-epithiopropyltelluromethyl)-5-[(2-β-epithiopropyltelluroethyl)selenomethyl]-3,7-dithianonane, 1,10-bis(β-epithiopropyltelluro)-5,6-bis[(2-β-epithiopropyltelluroethyl)thio]-3,6,9-trithiadecane, 1,11-bis(β-epithiopropyltelluro)-4,8-bis(β-epithiopropyltelluromethyl)-3,6,9-trithiaundecane, 1,11-bis(β-epithiopropyltelluro)-5,7-bis(β-epithiopropyltelluromethyl)-3,6,9-trithiaundecane, 1,11-bis(β-epithiopropyltelluro)-5,7-[(2-β-epithiopropyltelluroethyl)selenomethyl]-3,6,9-trithiaundecane, 1,11-bis(β-epithiopropyltelluro)-4,7-bis(β-epithiopropyltelluromethyl)-3,6,9-trithiaundecane, tetra[2-(β-epithiopropyltelluro)acetylmethyl]methane, 1,1,1-tri[2-(β-epithiopropyltelluro)acetylmethyl]propane, tetra[2-(β-epithiopropyltelluromethyl)acetylmethyl]methane, 1,1,1-tri[2-(β-epithiopropyltelluromethyl)acetylmethyl]propane, bis(5,6-epithio-3-tellurohexyl) selenide, 2,3-bis(6,7-thioepoxy-1-selena-4-telluroheptyl)-1-(3,4-thioepoxy-1-tellurobutyl)propane, 1,1,3,3-tetrakis(4,5-thioepoxy-2-telluropentyl)-2-selenapropane, bis(4,5-thioepoxy-2-telluropentyl)-3,6,9-triselenaundecane-1,11-bis(3,4-thioepoxy-1-tellurobutyl), 1,4-bis(3,4-thioepoxy-1-tellurobutyl)-2,3-bis(6,7-thioepoxy-1-selena-4-telluroheptyl)butane, tris(4,5-thioepoxy-2-telluropentyl)-3-selena-6-thiaoctane-1,8-bis(3,4-thioepoxy-1-tellurobutyl), bis(5,6-epithio-3-tellurohexyl) telluride, 2,3-bis(6,7-thioepoxy-1-tellura-4-telluroheptyl)-1-(3,4-thioepoxy-1-tellurobutyl)propane, 1,1,3,3-tetrakis(4,5-thioepoxy-2-telluropentyl)-2-tellurapropane, bis(4,5-thioepoxy-2-telluropentyl)-3,6,9-tritelleraundecane-1,11-bis(3,4-thioepoxy-1-tellurobutyl), 1,4-bis(3,4-thioepoxy-1-tellurobutyl)-2,3-bis(6,7-thioepoxy-1-tellura-4-telluroheptyl)butane, and tris(4,5-thiepoxy-2-telluropentyl)-3-tellura-6-thiaoctane-1,8-bis(3,4-thioepoxy-1-tellurobutyl);

E-2: Compounds having Alicyclic Backbone 1,3- or 1,4-bis(β-epithiopropyltelluro)cyclohexane, 1,3- or 1,4-bis(β-epithiopropyltelluromethyl)cyclohexane, bis[4-(β-epithiopropyltelluro)cyclohexyl]methane, 2,2-bis[4-(β-epithiopropyltelluro)cyclohexyl]propane, bis[4-(β-epithiopropyltelluro)cyclohexyl] sulfide, 2,5-bis(β-epithiopropyltelluromethyl)-1,4-dithiane, 2,5-bis(β-epithiopropyltelluroethylthiomethyl)-1,4-dithiane, 2,3-, 2,5- or 2,6-bis(3,4-epithio-1-tellurobutyl)-1,4-diselenane, 2,3-, 2,5- or 2,6-bis(4,5-epithio-2-telluropentyl)-1,4-diselenane, 2,4-, 2,5- or 5,6-bis(3,4-epithio-1-tellurobutyl)-1,3-diselenane, 2,4-, 2,5- or 5,6-bis(4,5-epithio-2-telluropentyl)-1,3-diselenane, 2,3-, 2,5-, 2,6- or 3,5-bis(3,4-epithio-1-tellurobutyl)-1-thia-4-selenane, 2,3-, 2,5-, 2,6- or 3,5-bis(4,5-epithio-2-telluropentyl)-1-thia-4-selenolane, 2,4- or 4,5-bis(3,4-epithio-1-tellurobutyl)-1,3-diselenolane, 2,4- or 4,5-bis(4,5-epithio-2-telluropentyl)-1,3-diselenolane, 2,4-, 2,5- or 4,5-bis(3,4-epithio-1-tellurobutyl)-1-thia-3-selenoolane, 2,4-, 2,5- or 4,5-bis(4,5-epithio-2-telluropentyl)-1-thia-3-selenolane, 2,6-bis(4,5-epithio-2-telluropentyl)-1,3,5-triselenane, bis(3,4-epithio-1-tellurobutyl) tricycloselenaoctane, bis(3,4-epithio-1-tellurobutyl) dicycloselenanoane, 2,3-, 2,4-, 2,5- or 3,4-bis(3,4-epithio-1-tellurobutyl)selenophane, 2,3-, 2,4-, 2,5- or 3,4-bis(4,5-epithio-2-telluropentyl)selenophane, 2-(4,5-thioepoxy-2-telluropentyl)-5-(3,4-thioepoxy-1-tellurobutyl)-1-selenacyclohexane, 2,3-, 2,4-, 2,5-, 2,6-, 3,4-, 3,5- or 4,5-bis(3,4-thioepoxy-1-tellurobutyl)-1-selenacyclohexane, 2,3-, 2,4-, 2,5-, 2,6-, 3,4-, 3,5- or 4,5-bis(4,5-thioepoxy-2-telluropentyl)-1-selenacyclohexane, 2,3-, 2,5- or 2,6-bis(3,4-epithio-1-tellurobutyl)-1,4-ditellurane, 2,3-, 2,5- or 2,6-bis(4,5-epithio-2-telluropentyl)-1,4-ditellurane, 2,4-, 2,5- or 5,6-bis(3,4-epithio-1-tellurobutyl)-1,3-ditellurane, 2,4-, 2,5- or 5,6-bis(4,5-epithio-2-telluropentyl)-1,3-ditellurane, 2,3-, 2,5-, 2,6- or 3,5-bis(3,4-epithio-1-tellurobutyl)-1-thia-4-tellurane, 2,3-, 2,5-, 2,6- or 3,5-bis(4,5-epithio-2-telluropentyl)-1-thia-4-tellurane, 2,4- or 4,5-bis(3,4-epithio-1-tellurobutyl)-1,3-ditellurolane, 2,4- or 4,5-bis(4,5-epithio-2-telluropentyl)-1,3-ditellurolane, 2,4-, 2,5- or 4,5-bis(3,4-epithio-1-tellurobutyl)-1-thia-3-tellurolane, 2,4-, 2,5- or 4,5-bis(4,5-epithio-2-telluropentyl)-1-thia-3-tellurolane, 2,6-bis(4,5-epithio-2-telluropentyl)-1,3,5-tritellurane, bis(3,4-epithio-1-tellurobutyl)tricyclotelluraoctane, bis(3,4-epithio-1-tellurobutyl)dicyclotelluranonane, 2,3-, 2,4-, 2,5- or 3,4-bis(3,4-epithio-1-tellurobutyl)tellurophane, 2,3-, 2,4-, 2,5- or 3,4-bis(4,5-epithio-2-telluropentyl)tellurophane, 2-(4,5-thioepoxy-2-telluropentyl)-5-(3,4-thioepoxy-1-tellurobutyl)-1-telluracyclohexane, 2,3-, 2,4-, 2,5-, 2,6-, 3,4-, 3,5- or 4,5-bis(3,4-thioepoxy-1-tellurobutyl)-1-telluracyclohexane, and 2,3-, 2,4-, 2,5-, 2,6-, 3,4-, 3,5- or 4,5-bis(4,5-thioepoxy-2-telluropentyl)-1-telluracyclohexane;

E-3: Compounds Having Aromatic Backbone 1,3- or 1,4-bis(β-epithiopropyltelluro)benzene, 1,3- or 1,4-bis(β-epithiopropyltelluromethyl)benzene, bis[4-(β-epithiopropyltelluro)phenyl]methane, 2,2-bis[4-(β-epithiopropyltelluro)phenyl]propane, bis[4-(β-epithiopropyltelluro)phenyl] sulfide, bis[4-(β-epithiopropyltelluro)phenyl] sulfone, and 4,4'-bis(β-epithiopropyltelluro)biphenyl; and compounds obtained by replacing at least one hydrogen of the β-epithiopropyl group in the above compounds with methyl.

The episulfide compounds (A) to (E) may include the organic compounds having an unsaturated group. Preferred examples thereof include vinylphenyl thioglycidyl ether, vinylbenzyl thioglycidyl ether, thioglycidyl methacrylate, thioglycidyl acrylate and allyl thioglycidyl ether.

Further, the other examples of the compounds having one epithio group includes sulfide compounds such as ethylene sulfide, propylene sulfide, and thioglycidol; thioglycidyl esters of mono carboxylic acid such as acetic acid, propionic acid, and benzoic acid; and thioglycidyl ether such as methyl thioglycidyl ether, ethyl thioglycidyl ether, propyl thioglycidyl ether, and butyl thioglycidyl ether.

In the above, more preferred examples are the episulfide compounds (B), the episulfide compounds (C), and the episulfide compounds (D), and most preferred are the episulfide compounds (C) and the episulfide compounds (D) such as chain compounds, branched compounds, alicyclic compounds, aromatic compounds and hetero cyclic compounds having two or more epithioethylthio group, epithioethylseleno group, β-epithiopropylthio group, β-epithiopropylseleno group as described above. Of the above, particularly preferred are chain compounds having two or more epithioethylthio group, epithioethylseleno group, β-epithiopropylthio group and β-epithiopropylseleno group, such as bis(epithioethyl) sulfide, bis(epithioethyl) disulfide, bis(epithioethyl) selenide, bis(epithioethyl) diselenide, bis(β-epithiopropyl) sulfide, bis(β-epithiopropyl) disulfide, bis(β-epithiopropyl) selenide, and bis(β-epithiopropyl) diselenide.

Further, examples of the compound (a) include the episulfide compounds with its episulfide group replaced by epoxy group.

The amine compound serving as the compound (b) includes the following compounds.

Compounds represented by the following Formula (2):

$$R^5{}_a NH_b \qquad (2)$$

wherein $R^5$ is an alkyl group having 1 to 8 carbon atoms; a is an integer from 1 to 3; b is an integer from 0 to 2; and a+b is 3.

Examples of the compounds of Formula (2) include methylamine, ethylamine, propylamine, butylamine, pentylamine, hexylamine, heptylamine, octylamine, dimethylamine, diethylamine dipropylamine, dibutylamine, dipentylamine, dihexylamine, diheptylamine, dioctylamine, trimethylamine, triethylamine, tripropylamine, tributylamine, tripentylamine, trihexylamine, triheptylamine, and trioctylamine.

Compounds represented by the following Formula (3):

$$R^6(NH_2)c \qquad (3)$$

wherein $R^6$ is a hydrocarbon group having 1 to 8 carbon atoms; and c is an integer from 2 to 4.

Examples of the compounds of Formula (3) include diaminomethane, diaminoethane, diaminopropane, diaminobutane, diaminopentane, diaminohexane, diaminoheptane, diaminooctane, triaminoethane, triaminopropane, triaminobutane, triaminopentane, triaminohexane, triaminoheptane, triaminooctane, tetraaminoethane, tetraaminopropane, tetraaminobutane, tetraaminopentane, tetraaminohexane, tetraaminoheptane, and tetraaminooctane.

Compounds represented by the following Formula (4):

$$C-A_d \qquad (4)$$

wherein C is a mono- or divalent radical derived from a cycloalkane having 5 to 8 carbon atoms, a cycloalkene having 5 to 8 carbon atoms, a cycloalkadiene having 5 to 8 carbon atoms, norbornane, norbornene, norbornadiene, tricyclodecane, tricyclodecene, tricyclodecadiene, pentacyclopentadecane, or pentacyclopentadecadiene; A is —$NH_2$ or —$CH_2NH_2$; d is 1 or 2; provided that C may be substituted by one or two methyl or ethyl when A is —$NH_2$ and d is 2.

Examples of the compounds of Formula (4) include monoamino compounds such as aminocyclopentane, aminocyclopentene, aminocyclopentadiene, aminocyclohexane, aminocyclohexene, aminocyclohexadiene, aminocyclooctane, aminocyclooctene, aminocyclooctadiene, aminonorbornane, aminonorbornene, aminonorbornadiene, aminotricyclodecane, aminotricyclodecene, aminotricyclodecadiene, aminopentacyclopentadecane, and aminopentacyclopentadecadiene; mono(aminomethyl) compounds such as (aminomethyl)cyclopentane, (aminomethyl)cyclopentene, (aminomethyl)cyclopentadiene, (aminomethyl)cyclohexane, (aminomethyl)cyclohexene, (aminomethyl)cyclohexadiene, (aminomethyl)cyclooctane, (aminomethyl)cyclooctene, (aminomethyl)cyclooctadiene, (aminomethyl)norbornane, (aminomethyl)norbornene, (aminomethyl)norbornadiene, (aminomethyl)tricyclodecane, (aminomethyl)tricyclodecene, (aminomethyl)tricyclodecadiene, (aminomethyl)pentacyclopentadecane, and (aminomethyl)pentacyclopentadecadiene; diamino compounds such as diaminocyclopentane, diaminocyclopentene, diaminocyclopentadiene, diaminocyclohexane, diaminocyclohexene, diaminocyclohexadiene, diaminocyclooctane, diaminocyclooctene, diaminocyclooctadiene, diaminonorbornane, diaminonorbornene, diaminonorbornadiene, diaminotricyclodecane, diaminotricyclodecene, diaminotricyclodecadiene, diaminopentacyclopentadecane, and diaminopentacyclopentadecadiene; bis(aminomethyl) compounds such as bis(aminomethyl)cyclopentane, bis(aminomethyl)cyclopentene, bis(aminomethyl)cyclopentadiene, bis(aminomethyl)cyclohexane, bis(aminomethyl)cyclohexene, bis(aminomethyl)cyclohexadiene, bis(aminomethyl)cyclooctane, bis(aminomethyl)cyclooctene, bis(aminomethyl)cyclooctadiene, bis(aminomethyl)norbornane, bis(aminomethyl)norbornene, bis(aminomethyl)norbornadiene, bis(aminomethyl)tricyclodecane, bis(aminomethyl)tricyclodecene, bis(aminomethyl)tricyclodecadiene, bis(aminomethyl)pentacyclopentadecane, and bis(aminomethyl)pentacyclopentadecadiene; diamino compounds having one methyl group such as diaminomethylcyclopentane, diaminomethylcyclopentene, diaminomethylcyclopentadiene, diaminomethylcyclohexane, diaminomethylcyclohexene, diaminomethylcyclohexadiene, diaminomethylcyclooctane, diaminomethylcyclooctene, diaminomethylcyclooctadiene, diaminomethylnorbornane, diaminomethylnorbornene, diaminomethylnorbornadiene, diaminomethyltricyclodecane, diaminomethyltricyclodecene, diaminomethyltricyclodecadiene, diaminomethylpentacyclopentadecane, and diaminomethylpentacyclopentadecadiene; diamino compounds having two methyl groups such as diaminodimethylcyclopentane, diaminodimethylcyclopentene, diaminodimethylcyclopentadiene, diaminodimethylcyclohexane, diaminodimethylcyclohexene, diaminodimethylcyclohexadiene, diaminodimethylcyclooctane, diaminodimethylcyclooctene, diaminodimethylcyclooctadiene, diaminodimethylnorbornane, diaminodimethylnorbornene, diaminodimethylnorbornadiene, diaminodimethyltricyclodecane, diaminodimethyltricyclodecene, diaminodimethyltricyclodecadiene, diaminodimethylpentacyclopentadecane, and diaminodimethylpentacyclopentadecadiene; diamino compounds having one ethyl group such as diaminoethylcyclopentane, diaminoethylcyclopentene, diaminoethylcyclopentadiene, diaminoethylcyclohexane, diaminoethylcyclohexene, diaminoethylcyclohexadiene, diaminoethylcyclooctane, diaminoethylcyclooctene, diaminoethylcyclooctadiene, diaminoethylnorbornane, diaminoethylnorbornene, diaminoethylnorbornadiene, diaminoethyltricyclodecane, diaminoethyltricyclodecene, diaminoethyltricyclodecadiene, diaminoethylpentacyclopentadecane, and diaminoethylpentacyclopentadecadiene; and diamino compounds having two ethyl groups such as diaminodiethylcyclopentane, diaminodiethylcyclopentene, diaminodiethylcyclopentadiene, diaminodiethylcyclohexane, diaminodiethylcyclohexene, diaminodiethylcyclohexadiene, diaminodiethylcyclooctane, diaminodiethylcyclooctene, diaminodiethylcyclooctadiene, diaminodiethylnorbornane, diaminodiethylnorbornene, diaminodiethylnorbornadiene, diaminodiethyltricyclodecane, diaminodiethyltricyclodecene, diaminodiethyltricyclodecadiene, diaminodiethylpentacyclopentadecane, and diaminodiethylpentacyclopentadecadiene.

Compounds represented by the following Formula (5):

$$Ar\text{-}A_e \quad (5)$$

wherein Ar is a radical derived from benzene, naphthalene, anthracene or phenanthrene; A is —NH$_2$ or —CH$_2$NH$_2$; and e is 1 or 2; provided that Ar may be substituted by 1 to 4 substituents selected from methyl, ethyl, fluoro, chloro and bromo.

Examples of the compounds of Fourmula (5) include monoamino compounds such as aniline, aminonaphthalene, aminoanthracene, amino phenanthrene, aminotoluene, aminoxylene, aminofluorobenzene, aminofluoronaphthalene, aminofluorotoluene, aminofluoroxylene, aminochlorobenzene, aminochloronaphthalene, aminochlorotoluene, aminochloroxylene, aminobromobenzene, aminobromonaphthalene, aminobromotoluene, and aminobromoxylene; mono(aminomethyl) compounds such as (aminomethyl)benzene, (aminomethyl)naphthalene, (aminomethyl)toluene, (aminomethyl)xylene, (aminomethyl)fluorobenzene, (aminomethyl)fluoronaphthalene, (aminomethyl)fluorotoluene, (aminomethyl)fluoroxylene, (aminomethyl)chlorobenzene, (aminomethyl)chloronaphthalene, (aminomethyl)chlorotoluene, (aminomethyl)chloroxylene, (aminomethyl)bromobenzene, (aminomethyl)bromonaphthalene, (aminomethyl)bromotoluene, and (aminomethyl)bromoxylene; diamino compounds such as aminoaniline, diaminonaphthalene, diaminotoluene, diaminoxylene, diaminofluorobenzene, diaminofluoronaphthalene, diaminofluorotoluene, diaminofluoroxylene, diaminochlorobenzene, diaminochloronaphthalene, diaminochlorotoluene, diaminochloroxylene, diaminobromobenzene, diaminobromonaphthalene, diaminobromotoluene, diaminobromoxylene; bis(aminomethyl) compounds such as bis(aminomethyl)benzene, bis(aminomethyl)naphthalene, bis(aminomethyl)toluene, bis(aminomethyl)xylene, bis(aminomethyl)fluorobenzene, bis(aminomethyl)fluoronaphthalene, bis(aminomethyl)fluorotoluene, bis(aminomethyl)fluoroxylene, bis(aminomethyl)chlorobenzene, bis(aminomethyl)chloronaphthalene, bis(aminomethyl)chlorotoluene, bis(aminomethyl)chloroxylene, bis(aminomethyl)bromobenzene, bis(aminomethyl)bromonaphthalene, bis(aminomethyl)bromotoluene, and bis(aminomethyl)bromoxylene; diamino compounds having one methyl group such as diaminomethylnaphthalene, diaminomethylfluorobenzene, diaminomethylfluoronaphthalene, diaminomethylfluorotoluene, diaminomethylfluoroxylene, diaminomethylchlorobenzene, diaminomethylchloronaphthalene, diaminochlorotoluene, diaminomethylbromobenzene, diaminomethylbromonaphthalene, and diaminobromotoluene; diamino compounds having two methyl groups such as aminodimethylaniline, diaminodimethylnaphthalene, diaminodimethylfluorobenzene, diaminodimethylfluoronaphthalene, diaminomethylfluorotoluene, diaminofluoroxylene, diaminodimethylchlorobenzene, diaminodimethylchloronaphthalene, diaminochloroxylene, diaminodimethylbromobenzene, diaminodimethylbromonaphthalene, and diaminobromoxylene; diamino compounds having one ethyl group such as diaminoethylbenzene, diaminoethylnaphthalene, diaminoethylfluorobenzene, diaminoethylfluoronaphthalene, diaminoethylfluorotoluene, diaminoethylfluoroxylene, diaminoethylchlorobenzene, diaminoethylchloronaphthalene, diaminoethylchlorobenzene, diaminoethylbromobenzene, diaminoethylbromonaphthalene, and diaminoethylbromobenzene; diamino compounds having two ethyl groups such as diaminodiethylbenzene, diaminodiethyltoluene, diaminodiethylxylene, diaminodiethylnaphthalene, diaminodiethylfluorobenzene, diaminodiethylfluoronaphthalene, diaminodiethylfluorotoluene, diaminodiethylfluorobenzene, diaminodiethylchlorobenzene, diaminodiethylchloronaphthalene, diaminodiethylchlorobenzene, diaminodiethylbromobenzene, diaminodiethylbromonaphthalene, and diaminodiethylbromobenzene.

Compounds represented by the following Formula (6):

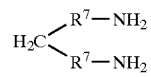

(6)

wherein R$^7$ is phenylene group or cyclohexylene group which may be substituted by 1 to 3 substituents selected from alkyl having 1 to 4 carbon atoms, chloro, bromo and iodo.

Examples of the compounds of Formula (6) include compounds wherein R$^7$ is phenylene such as methylene bis(aminobenzene), methylene bis(aminotoluene), methylene bis(aminoxylene), methylene bis(aminomethylethylbenzene), methylene bis(aminomethylpropylbenzene), methylene bis(aminomethylbutylbenzene), methylene bis(aminodiethylbenzene), methylene bis(aminoethylpropylbenzene), methylene bis(aminodipropylbenzene), methylene bis(aminopropylbutylbenzene), methylene bis(aminodibutylbenzene), methylene bis(aminochlorobenzene), methylene bis(aminochlorotoluene), methylene bis(aminochloroxylene), methylene bis(aminochloromethylethylbenzene), methylene bis(aminochloromethylpropylbenzene), methylene bis(aminochloromethylbutylbenzene), methylene bis(aminochlorodiethylbenzene), methylene bis(aminochloroethylpropylbenzene), methylene bis(aminochlorodipropylbenzene), methylene bis(aminochloropropylbutylbenzene), methylene bis(aminochlorodibutylbenzene), methylene bis(aminobromobenzene), methylene bis(aminobromotoluene), methylene bis(aminobromoxylene), methylene bis(aminobromomethylethylbenzene), methylene bis(aminobromomethylpropylbenzene), methylene bis (aminobromomethylbutylbenzene), methylene bis(aminobromodiethylbenzene), methylene bis(aminobromoethylpropylbenzene), methylene bis(aminobromodipropylbenzene), methylene bis(aminobromopropylbutylbenzene), methylene bis(aminobromodibutylbenzene), methylene bis(aminoiodobenzene), methylene bis(aminoiodotoluene), methylene bis(aminoiodoxylene), methylene bis(aminoiodomethylethylbenzene), methylene bis(aminoiodomethylpropylbenzene), methylene bis(aminoiodomethylbutylbenzene), methylene bis(aminoiododiethylbenzene), methylene bis(aminoiodoethylpropylbenzene), methylene bis(aminoiododipropylbenzene), methylene bis(aminoiodopropylbutylbenzene), and methylene bis(aminoiododibutylbenzene); and compounds wherein $R^7$ is cyclohexylene such as methylene bis(aminocyclohexane), methylene bis(aminomethylcyclohexane), methylene bis(aminodimethylcyclohexane), methylene bis(aminomethylethylcyclohexane), methylene bis(aminomethylpropylcyclohexane), methylene bis(aminomethylbutylcyclohexane), methylene bis(aminodiethylcyclohexane), methylene bis(aminoethylpropylcyclohexane), methylene bis(aminodipropylcyclohexane), methylene bis(aminopropylbutylcyclohexane), methylene bis(aminodibutylcyclohexane), methylene bis(aminochlorocyclohexane), methylene bis(aminochloromethylcyclohexane), methylene bis(aminochlorodimethylcyclohexane), methylene bis(aminochloromethylethylcyclohexane), methylene bis(aminochloromethylpropylcyclohexane), methylene bis(aminochloromethylbutylcyclohexane), methylene bis(aminochlorodiethylcyclohexane), methylene bis(aminochloroethylpropylcyclohexane), methylene bis(aminochlorodipropylcyclohexane), methylene bis(aminochloropropylbutylcyclohexane), methylene bis(aminochlorodibutylcyclohexane), methylene bis(aminobromocyclohexane), methylene bis(aminobromochlorocyclohexane), methylene bis(aminobromodimethylcyclohexane), methylene bis(aminobromomethylethylcyclohexane), methylene bis(aminobromomethylpropylcyclohexane), methylene bis(aminobromomethylbutylcyclohexane), methylene bis(aminobromodiethylcyclohexane), methylene bis(aminobromoethylpropylcyclohexane), methylene bis(aminobromodipropylcyclohexane), methylene bis(aminobromopropylbutylcyclohexane), methylene bis(aminobromodibutylcyclohexane), methylene bis(aminoiodocyclohexane), methylene bis(aminoiodotoluene), methylene bis(aminoiodoxylene), methylene bis(aminoiodomethylethylcyclohexane), methylene bis(aminoiodomethylpropylcyclohexane), methylene bis(aminoiodomethylbutylcyclohexane), methylene bis(aminoiododiethylcyclohexane), methylene bis(aminoiodoethylpropylcyclohexane), methylene bis(aminoiododipropylcyclohexane), methylene bis(aminoiodopropylbutylcyclohexane), and methylene bis(aminoiododibutylcyclohexane).

Compounds represented by the following Formula (7):

B—$R^8$—SH (7)

wherein $R^8$ is phenylene group or cyclohexylene group; B is —$NH_2$ when $R^8$ is phenylene or B is —$NH_2$ or —$R^9NH_2$ when $R^8$ is cyclohexylene group; and $R^9$ is alkylene group having 1 to 4 carbon atoms; provided that $R^8$ may be substituted by one or two alkyl groups having 1 to 4 carbon atoms.

Examples of the compounds of Formula (7) include compounds wherein $R^8$ is phenylene such as aminobenzenethiol, aminomethylbenzenethiol, aminoethylbenzenethiol, aminopropylbenzenethiol, aminobutylbenzenethiol, aminodimethylbenzenethiol, aminodiethylbenzenethiol, aminodipropylbenzenethiol, aminodibutylbenzenethiol, aminoethylmethylbenzenethiol, aminopropylmethylbenzenethiol, aminobutylpropyl-benzenethiol, aminoethylpropylbenzenethiol, aminoethylbutylbenzenethiol, and aminopropylbutylbenzenethiol; and compounds wherein $R^8$ is cyclohexylene such as aminomercaptocyclohexane, (aminomethyl)mercaptocyclohexane, (aminoethyl)mercaptocyclohexane, (aminopropyl)mercaptocyclohexane, (aminobutyl)mercaptocyclohexane, amino(dimethyl)mercaptocyclohexane, amino(diethyl)mercaptocyclohexane, amino(dipropyl)mercaptocyclohexane, amino(dibutyl)mercaptocyclohexane, amino (ethylmethyl)mercaptocyclohexane, amino(propylmethyl)mercaptocyclohexane, amino(butylpropyl)cyclohexane, amino(ethylpropyl)mercaptocyclohexane, amino(ethylbutyl)mercaptocyclohexane, and amino(propylbutyl)mercaptocyclohexane.

Also, (amino)(mercapto)-1,4-dithiane; amino($C_2$–$C_6$ alkane)thiols such as aminoethanethiol, aminopropanethiol, aminobutanethiol, aminopentanethiol, and aminohexanethiol; aminomercaptopyridine; aminofurfurylmercaptane; aminomercaptothiazole; and aminomercaptotriazole are usable as the compounds (b).

The amine compound may contain a color tone stabilizer. The amine compound may partly include a mercapto compound or may be an amino-terminated polymeric compound.

Preferred compounds (b) are the compounds having two or more amino groups such as the compounds of Formula (3), the compounds of Formula (4) wherein d is 2, the compounds of Formula (5) wherein e is 2, and the compounds of Formula (6); and the compounds of Formula (7).

More preferred compounds (b) are the compounds of Formula (5) wherein e is 2, the compounds of Formula (6) and the compounds of Formula (7), still more preferred compounds (b) are the compounds of Formula (5) wherein e is 2 and the compounds of Formula (7), and most preferred compounds (b) are the compounds of Formula (7).

The isocyanate compound serving as the compound (c) includes any compounds having in one molecule at least one isocyanate group and/or isothiocyanate group. Examples of the compounds (c) includes isocyanate compounds such as methyl isocyanate, ethyl isocyanate, propyl isocyanate, isopropyl isocyanate, n-butyl isocyanate, sec-butyl isocyanate, tert-butyl isocyanate, pentyl isocyanate, hexyl isocyanate, octyl isocyanate, dodecyl isocyanate, cyclohexyl isocyanate, phenyl isocyanate, tolyl isocyanate, diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, 1,4-bis(isocyanatomethyl)cyclohexane, isophorone diisocyanate, 2,6-bis(isocyanatomethyl)decahydronaphthalene, lysine triisocyanate, 2,4-tolylenediisocyanate, 2,6-tolylene diisocyanate, o-tolydyne diisocyanate, 4,4'-diphneylmethane diisocyanate, diphenyl ether diisocyanate, 3-(2'-isocyanatecyclohexyl)propyl isocyanate, tris(phenylisocyanate) thiophosphate, isopropylidene bis(cyclohexylisocyanate), 2,2'-bis(4-isoisocyanatephenyl)propane, triphenylmethane triisocyanate, bis(diisocyanatetolyl)phenylmethane, 4,4',4"-triisocyanate-2,5-dimethoxyphenylamine, 3,3'-dimethoxybenzidine-4,4'-diisocyanate, 1,3-phenylene diisocyanate, 1,4-phenylene diisocyanate, 4,4'-diisocyanatobiphenyl, 4,4'-diisocyanato-3,3'-dimethylbiphenyl, dicyclohexylmethane-4,4'-diisocyanate, 1,1'-methylenebis(4-isocyanatobenzene), 1,1'-methylenebis(3-methyl-4-isocyanatobenzene), m-xylylene diisocyanate, p-xylylene diisocyanate, 1,3-bis(1-isocyanate-1-methylethyl)benzene, 1,4-bis(1-isocyanate-1-methylethyl)benzene, 1,3-bis(2-isocyanato-2-propyl)benzene, 2,6-bis(isocyanatomethyl)naphthalene, 1,5-naphthalene diisocyanate, bis(isocyanatemethyl)tetrahydrodicyclopentadiene, bis(isocyanatemethyl)dicyclopentadiene, bis(isocyanatemethyl)tetrahydrothiophene, 2,5-diisocyanatemethylnorbornene, bis(isocyanatemethyl)adamantane, dimeric acid diisocyanate, 1,3,5-tri(1-isoisocyanatehexyl)isocyanuric acid, thiodiethyl diisocyanate, thiodipropyl diisocyanate, thiodihexyl diisocyanate, bis[(4-isocyanatomethyl)phenyl] sulfide, 2,5-diisocyanato-1,4-dithiane, 2,5-diisocyanatomethyl thiophene, dithiodiethyl diisocyanate, and dithiodipropyl diisocyanate; and compounds derived from the above isocyanate compounds by replacing all or a part of the isocyanate group thereof with isothiocyanate group. The polyisocyanate compounds such as dimers produced by biuret reaction, cyclic trimers, alcohol adducts and thiol adducts are usable as the compounds (c).

Another example of the isocyanate compounds as the compound (c) are NCO-terminated urethane prepolymers and NCO-terminated thiourethane polymers derived from an active hydrogen compound and an isocyanate compound.

Preferred examples of active hydrogen compounds for producing NCO-terminated urethane prepolymers and thiourethane prepolymers are polyester polyol, polythioester polyol, polythioester polythiol, polycaprolactone polyol, polycaprolactone polythiol, polyether polyol, polyether polythiol, polythioether polyol, polythioether polythiol, polycarbonate polyol, polycarbonate polythiol, polyurethane polyol, polyurethane polythiol, polythiourethane polythiol, bis(7-mercapto-2,5-dithiaheptylphenyl) sulfide, and polymercapto compound, each having molecular weight of 400 to 5000. The active hydrogen compound is preferably reacted with an isocyanate compound in an active hydrogen group/NCO group ratio of 1.0 to 5.0.

Preferred compound (c) are the compounds having two or more isocyanate groups. Examples of the isocyanate compounds are diethylene diisocyanate, tetramethylene diisocyanate, hexamethylene diisocyanate, trimethylhexamethylene diisocyanate, cyclohexane diisocyanate, 1,3-bis(isocyanatomethyl)cyclohexane, 1,4-bis(isocyanatomethyl)cyclohexane, isophorone diisocyanate, 2,6-bis(isocyanatomethyl)decahydronaphthalene, lysine triisocyanate, 2,4-tolylene diisocyanate, 2,6-tolylene diisocyanate, o-tolydyne diisocyanate, 4,4'-diphneylmethane diisocyanate, diphenyl ether diisocyanate, 3-(2'-isocyanatocyclohexyl)propyl isocyanate, tris(phenylisocyanate) thiophosphate, isopropylidene bis(cyclohexylisocyanate), 2,2'-bis(4-isoisocyanatophenyl)propane, triphenylmethane triisocyanate, bis(diisocyanatotolyl)phenylmethane, 4,4',4"-triisocyanato-2,5-dimethoxyphenylamine, 3,3'-dimethoxybenzidine-4,4'-diisocyanate, 1,3-phenylene diisocyanate, 1,4-phenylene diisocyanate, 4,4'-diisocyanatobiphenyl, 4,4'-diisocyanato-3,3'-dimethylbiphenyl, dicyclohexylmethane-4,4'-diisocyanate, 1,1'-methylenebis(4-isocyanatobenzene), 1,1'-methylenebis(3-methyl-4-isocyanatobenzene), m-xylylene diisocyanate, p-xylylene diisocyanate, 1,3-bis(1-isocyanato-1-methylethyl)benzene, 1,4-bis(1-isocyanato-1-methylethyl)benzene, 1,3-bis(2-isocyanato-2-propyl)benzene, 2,6-bis(isocyanatomethyl)naphthalene, 1,5-naphthalene diisocyanate, bis(isocyanatomethyl)tetrahydrodicyclopentadiene, bis(isocyanatomethyl)dicyclopentadiene, bis(isocyanatomethyl)tetrahydrothiophene, 2,5-diisocyanatomethylnorbornene, bis(isocyanatomethyl)adamantane, dimeric acid diisocyanate, 1,3,5-tri(1-isoisocyanatohexyl)isocyanuric acid, thiodiethyl diisocyanate, thiodipropyl diisocyanate, thiodihexyl diisocyanate, bis[(4-isocyanatomethyl)phenyl] sulfide, 2,5-diisocyanato-1,4-dithiane, 2,5-diisocyanatomethyl-1,4-dithiane, 2,5-diisocyanatomethyl thiophene, dithiodiethyl diisocyanate, dithiodipropyl diisocyanate, and the above compounds with its all or part of isocyanate group replaced by isothiocyanate group. Examples thereof also include NCO-biterminated urethane prepolymer and thiourethane prepolymer derived from an active hydrogen compound and an isocyanate compound.

Particularly preferred compound (c) are dicyclohexylmethan-4,4'-diisocyanate and NCO-biterminated urethane or thiourethane prepolymer derived from an active hydrogen compound and an isocyanate compound.

The compound (a), (b) and (c) are not limited to those mentioned above and may be used alone or in combination of two or more.

The composition of the present invention comprising the compound (a), compound (b), compound (c) is polymerized to a resin under heating in the presence or absence of a curing catalyst, preferably in the presence of a curing catalyst. The polymerization may be carried out by first prepolymerizing the compound (a) with the compound (b), and then with the compound (c), alternatively, by first prepolymerizing the compound (a) with the compound (c), and then with the compound (b). Any other combinations of the compounds (a), (b) and (c) may be available for prepolymerization.

As the curing catalyst, usable are amines, phosphines, quaternary ammonium salts, quaternary phosphonium salts, tertiary sulfonium salts, secondary iodonium salts, mineral acids, Lewis acids, organic acids, silicic acids, tetrafluoroboric acids, peroxides, azo compounds, condensates of aldehyde and amine compound, guanidine compounds, thiourea compounds, thiazole compounds, sulfenamide compounds, thiuram compounds, salts of dithiocarbamic acid, salts of xanthogenic acid, and esters of acid phosphoric acid. Examples of the curing catalysts are mentioned below.

(1) Amines primary amines such as ethylamine, n-propylamine, sec-propylamine, n-butylamine, sec-butylamine, isobutylamine, tert-butylamine, pentylamine, hexylamine, heptylamine, octylamine, decylamine, laurylamine, myristylamine, 1,2-dimethylhexylamine, 3-pentylamine, 2-ethylhexylamine, allylamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenetylamine, α-phenylethylamine, naphthylamine and furfurylamine;

primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis-(3-aminopropyl) ether, 1,2-bis-(3-aminopropoxy)ethane, 1,3-bis-(3-aminopropoxy)-2, 2'-dimethylpropane, aminoethylethanolamine, 1,2-, 1,3- or 1,4-bisaminocyclohexane, 1,3- or 1,4-bisaminomethylcyclohexane, 1,3- or 1,4-bisaminoethylcyclohexane, 1,3- or 1,4-bisaminopropylcyclohexane, hydrogenated 4,4'-diaminodiphenylmethane, 2- or 4-aminopiperidine, 2- or 4-aminomethylpiperidine, 2- or 4-aminoethylpiperidine, N-aminoethylpiperidine, N-aminopropylpiperidine, N-aminoethylmorpholine, N-aminopropylmorpholine, isophoronediamine, menthanediamine, 1,4-bisaminopropylpiperadine, o-, m- or p-phenylenediamine, 2,4- or 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- or p-xylylenediamine, 1,5- or 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenyl sulfone, 4,4'-diaminoditolyl sulfone, methylenebis(o-chloroaniline), 3,9-bis(3-aminopropyl)-2,4,8,10-tetraoxaspiro[5.5]undecane, diethylenetriamine, iminobispropylamine, methyliminobispropylamine, bis(hexamethylene)triamine, triethylenetetramine, tetraethylenepentamine, pentaethylenehexamine, N-aminoethylpiperadine, N-aminopropylpiperadine, 1,4-bis(aminoethylpiperadine), 1,4-bis(aminopropylpiperadine), 2,6-diaminopyridine, and bis(3,4-diaminophenyl) sulfone;

secondary amines such as diethylamine, dipropylamine, di-n-butylamine, di-sec-butylamine, diisobutylamine, di-n-pentylamine, di-3-pentylamine, dihexylamine, dioctylamine, di(2-ethylhexyl)amine, methylhexylamine, diallylamine, pyrrolidine, piperidine, 2-, 3- or 4-picoline, 2,4-, 2,6- or 3,5-lupetidine, diphenylamine, N-methylaniline, N-ethylaniline, dibenzylamine, methylbenzylamine, dinaphthylamine, pyrrol, indoline, indole, and morpholine;

secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperadine, 2-methylpiperadine, 2,5- or 2,6-dimethylpiperadine, homopiperadine, 1,1-di(4-piperidyl)methane, 1,2-di(4-piperidyl)ethane, 1,3-di(4-piperidyl)propane, and 1,4-di(4-piperidyl)butane; tertiary amines such as trimethylamine, triethylamine, tri-n-propylamine, triisopropylamine, tri(1,2-dimethylpropyl)amine, tri(3-methoxypropyl)amine, tri-n-butylamine, triisobutylamine, tri-sec-butylamine, tri-n-pentylamine, tri-3-pentylamine, tri-n-hexylamine, tri-n-octylamine, tri(2-ethylhexyl)amine, tridodecylamine, trilaurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine, and 2-(2-dimethylaminoethoxy)-4-methyl-1,3,2-dioxabornane;

tertiary polyamines such as tetramethylethylenediamine, pyrazine, N,N'-dimethylpiperadine, N,N'-bis(2-hydroxypropyl)piperadine, hexamethylenetetramine, N,N,N',N'-tetramethyl-1,3-butaneamine, 2-dimethylamino-2-hydroxypropane, diethyaminoethanol, N,N,N-tris(3-dimethylaminopropyl)amine, 2,4,6-tris(N,N,-dimethylaminomethyl)phenol, and heptamethylisobiguanide;

imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 2-mercaptoimidazole, 2-mercapto-N-methylimidazole, 2-mercaptobenzimidazole, 3-mercapto-4-methyl-4H-1,2,4-triazole, 5-mercapto-1-methyl-tetrazole, 2,5-dimercapto-1,3,4-thiadiazole, 1-benzyl-2-methylimidazole, N-(2'-cyanoethyl)-2-methylimidazole, N-(2'-cycanoethyl)-2-undecylimidazole, N-(2'-cyanoethyl)-2-phenylimidazole, 3,3-bis-(2-ethyl-4-methylimidazolyl)methane, and addition products of alkylimidazoles and isocyanuric acid; and amidines such as 1,8-diazabicyclo[5.4.0]undecene-7, 1,5-diazabicyclo[4.3.0]nonene-5, and 6-dibutylamino-1,8-diazabicyclo[5.4.0]undecene-7.

(2) Complexes of Amines (1) and Borane or Boron Trifluoride (3) Phosphines trimethylphosphine, triethylphosphine, triisopropylphosphine, tri-n-butylphosphine, tri-n-hexylphosphine, tri-n-octylphosphine, tricyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, tris(4-methylphenyl)phosphine, dimethylphenylphosphine, diethylphenylphosphine, dicyclohexylphenylphosphine, ethyldiphenylphosphine, diphenylcyclohexylphosphine, and chlorodiphenylphosphine.

(4) Quaternary Ammonium Salts tetramethylammonium chloride, tetramethylammonium bromide, tetramethylammonium acetate, tetraethylammonium chloride, tetraethylammonium bromide, tetraethylammonium acetate, tetra-n-butylammonium fluoride, tetra-n-butylammonium chloride, tetra-n-butylammonium bromide, tetra-n-butylammonium iodide, tetra-n-butylammonium acetate, tetra-n-butylammonium borohydride, tetra-n-butylammonium hexafluorophosphite, tetra-n-butylammonium hydrogensulfite, tetra-n-butylammonium tetrafluoroborate, tetra-n-butylammonium tetraphenylborate, tetra-n-butylammonium p-toluenesulfonate, tetra-n-hexylammonium chloride, tetra-n-hexylammonium bromide, tetra-n-hexylammonium acetate, tetra-n-octylammonium chloride, tetra-n-octylammonium bromide, tetra-n-octylammonium acetate, trimethyl-n-octylammonium chloride, trimethyldecylammonium chloride, trimethyldodecylammonium chloride, trimethylcetylammonium chloride, trimethyllaurylammonium chloride, trimethylbenzylammonium chloride, trimethylbenzylammonium bromide, triethyl-n-octylammonium chloride, triethylbenzylammonium chloride, triethylbenzylammonium bromide, tri-n-butyl-n-octylammonium chloride, tri-n-butylbenzylammonium fluoride, tri-n-butylbenzylammonium chloride, tri-n-butylbenzylammonium bromide, tri-n-butylbenzylammonium iodide, n-butyldimethylbenzylammonium chloride, n-octyldimethylbenzylammonium chloride, decyidimethylbenzylammonium chloride, dodecyldimethylbenzylammonium chloride, cetyldimethylbenzylammonium chloride, lauryldimethylbenzylammonium chloride, methyltriphenylammonium chloride, methyltribenzylammonium chloride, methyltriphenylammonium bromide, methyltribenzylammonium bromide, ethyltriphenylammonium chloride, ethyltribenzylammonium chloride, ethyltriphenylammonium bromide, ethyltribenzylammonium bromide, n-butyltriphenylammonium chloride, n-butyltribenzylammonium chloride, n-butyltriphenylammonium bromide, n-butyltribenzylammonium bromide, 1-methylpyridinium chloride, 1-methylpyridinium bromide, 1-ethylpyridinium chloride, 1-ethylpyridinium bromide, 1-n-butylpyridinium chloride, 1-n-butylpyridinium bromide, 1-n-hexylpyridinium chloride, 1-n-hexylpyridinium bromide, 1-n-octylpyridinium bromide, 1-n-dodecylpyridinium chloride, 1-n-dodecylpyridinium bromide, 1-n-cetylpyridinium chloride, 1-n-cetylpyridinium bromide, 1-phenylpyridinium chloride, 1-phenylpyridinium bromide, 1-benzylpyridinium chloride, 1-benzylpyridinium bromide, 1-methylpicolinium chloride, 1-methylpicolinium bromide, 1-ethylpicolinium chloride, 1-ethylpicolinium bromide, 1-n-butylpicolinium chloride, 1-n-butylpicolinium bromide, 1-n-hexylpicolinium chloride, 1-n-hexylpicolinium bromide, 1-n-octylpicolinium chloride, 1-n-octylpicolinium bromide, 1-n-dodecylpicolinium chloride, 1-n-dodecylpicolinium bromide, 1-n-cetylpicolinium chloride, 1-n-cetylpicolinium bromide, 1-phenylpicolinium chloride, 1-phenylpicolinium bromide, 1-benzylpicolinium chloride, and 1-benzylpicolinium bromide.

(5) Quaternary Phosphonium Salts tetramethylphosphonium chloride, tetramethylphosphonium bromide, tetraethylphosphonium chloride, tetraethylphosphonium bromide, tetra-n-butylphosphonium chloride, tetra-n-butylphosphonium bromide, tetra-n-butylphosphonium iodide, tetra-n-hexylphosphonium bromide, tetra-n-octylphosphonium bromide, methyltriphenylphosphonium bromide, methyltriphenylphosphonium iodide, ethyltriphenylphosphonium bromide, ethyltriphenylphosphonium iodide, n-butyltriphenylphosphonium bromide, n-butyltriphenylphosphonium iodide, n-hexyltriphenylphosphonium bromide, n-octyltriphenylphosphonium bromide, tetraphenylphosphonium bromide, tetrakishydroxymethylphosphonium chloride, tetrakishydroxymethylphosphonium bromide, tetrakishydroxyethylphosphonium chloride, and tetrakishydroxybutylphosphonium chloride.

(6) Tertiary Sulfonium Salts trimethylsulfonium bromide, triethylsulfonium bromide, tri-n-butylsulfonium chloride, tri-n-butylsulfonium bromide, tri-n-butylsulfonium iodide, tri-n-butylsulfonium tetrafluoroborate, tri-n-hex ylsulfonium bromide, tri-n-octylsulfonium bromide, triphenylsulfonium chloride, triphenylsulfonium bromide, and triphenylsulfonium iodide.

(7) Secondary Iodonium Salts diphenyliodonium chloride, diphenyliodonium bromide, and diphenyliodonium iodide.

(8) Mineral Acids hydrochloric acid, sulfuric acid, nitric acid, phosphoric acid and carbonic acid, and half-esters of the mineral acids.

(9) Lewis Acids boron trifluoride, boron trifluoride etherate, aluminum fluoride, aluminum chloride, triphenylaluminum, potassium octanoate, calcium acetate, tetraisopropoxytitanium, tetrabutoxytitanium, tetrachlorotitanium, 2-ethylhexyl titanate, dimethyltin oxide, dimethyltin dichloride, dibutyltin diacetate, dibutyltin acetate, dibutyltin dilaurate, dibutyltin laurate, dibutyltin octanoate, dibutyltin bis(dodecylmercaptide), dibutyltin bis(isooctylthioglycolate), dibutyltin oxide, butyltin trichloride, dibutyltin dichloride, tributyltin chloride, tetrabutyltin, dioctyltin diacetate, dioctyltin acetate, dioctyltin dilaurate, dioctyltin laurate, dioctyltin diricinolate, dioctyltin dioleate, dioctyltin di(6-hydroxy)caproate, dioctyltin bis(isooctylthoglycolate), dioctyltin oxide, dioctyltin dichloride, dioctyltin maleate, dioctyltin bis(butylmaleate), didodecyltin diricinolate, tin stearate, zinc chloride, zinc acetylacetonato, copper oleate, copper acetylacetonato, iron acetylacetonato, iron naphthenate, iron lactate, iron citrate, and iron gluconate.

(10) Organic Acids and their Semi Esters.

(11) Silicic Acid and Tetrafluoroboric Acid.

(12) Peroxides cumyl peroxyneodecanoate, diisopropyl peroxydicarbonate, diallyl peroxydicarbonate, di-n-propyl peroxydicarbonate, dimyristyl peroxydicarbonate, cumyl peroxyneohexanoate, t-hexyl peroxyneodecanoate, t-butyl peroxyneodecanoate, t-hexyl peroxyneohexanoate, t-butyl peroxyneohexanoate, 2,4-dichlorobenzoyl peroxide, benzoyl peroxide, dicumyl peroxide, di-t-butyl peroxide, cumene hydroperoxide, and tert-butyl hydroperoxide.

(13) Azo Compounds 2,2'-Azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutylonitrile, 2,2'-azobis(2-methylbutylonitrile), 1,1'-azobis(cyclohexane-1-carbonitrile), 1-[(1-cyano-1-methyl)azo]formamide, 2-pneylazo-4-methoxy-2,4-dimethylvaleronitrile, 2,2'-azobis(2-methylpropane), and 2,2'-azobis(2,4,4-trimethylpentane).

(14) Condensates of Aldehyde and Amine Compound reaction product of acetaldehyde and ammonia, condensate of formaldehyde and p-toluidine, condensate of acetaldehyde and p-toluidine, reaction product of formaldehyde and aniline, reaction product of acetaldehyde and aniline, reaction product of butylaldehyde and aniline, reaction product of formaldehyde, acetaldehyde and aniline, reaction product of acetaldehyde, butylaldehyde and aniline, condensate of butylaldehyde and monobutylamine, reaction product of butylaldehyde and butylideneaniline, reaction product of heptaldehyde and aniline, reaction product of trichlotonylidenetetramine, condensate of α-ethyl-β-propylacrolein and aniline, and condensate of formaldehyde and alkylimidazole.

(15) Guanidine Compounds diphenylguanidine, phenyltolylguanidine, phenylxylylguanidine, tolylxylylguanidine, di-o-tolylguanidine, o-tolylguanide, diphenylguanidine phthalate, tetramethylguanidine, and di-o-tolylguanidine salt of dicatechol boric acid.

(16) Thiourea Compounds thiocarboanilide, di-o-tolylthiourea, ethylenethiourea, diethylthiourea, dibutylthiourea, dilaurylthiourea, trimethylthiourea, dimethylethylthiourea, and tetramethylthiourea.

(17) Thiazole Compounds 2-mercaptobenzothiazole, dibenzothiazyl disulfide, cyclohexylamine salt of 2-mercaptobenzothiazole, 2-(2,4-dinitrophenylthio)benzothiazole, 2-(morpholinodithio) benzothiazole, 2-(2,6-dimethyl-4-morpholinodithio) benzothiazole, N,N-diethylthiocarbamoyl-2-benzothiazolyl disulfide, 1,3-bis(2-benzothiazolylmercaptomethyl)urea, benzothiadiazylthio benzoate, 2-mercaptothiazoline, sodium salt of 2-mercaptobenzothiazole, zinc salt of 2-mercaptobenzothiazole, and complex of dibenzothiazyl disulfide and zinc chloride.

(18) Sulfenamide Compounds

N-cyclohexyl-2-benzothiazyl sulfenamide, N-t-butyl-2-benzothiazyl sulfenamide, N-t-oxtyl-2-benzothiazyl sulfenamide, N-oxydiethylene-2-benzothiazyl sulfenamide, N,N-diethyl-2-benzothiazyl sulfenamide, N,N-diisopropyl-2-benzothiazyl sulfenamide, and N,N-dicyclohexyl-2-benzothiazyl sulfenamide.

(19) Thiuram Compounds tetramethylthiuram monosulfide, tetraethylthiuram monosulfide, tetrabutylthiuram monosulfide, dipentamethylenethiuram monosulfide, tetramethylthiuram disulfide, tetraethylthiuram disulfide, tetrabutylthiuram disulfide, N,N'-dimethyl-N,N'-diphenylthiuram disulfide, N,N'-diethyl-N,N'-diphenylthiuram disulfide, dipentamethylenethiuram disulfide, dipentamethylenethiuram tetrasulfide, and cyclic thiuram.

(20) Salts of Dithiocarbamic Acid sodium dimethyldithiocarbamate, sodium diethyldithiocarbamate, sodium dibutyldithiocarbamate, sodium pentamethylenedithiocarbamate, sodium cyclohexylethyldithiocarbamate, potassium dimethyldithiocarbamate, lead dimethyldithiocarbamate, zinc dimethyldithiocarbamate, zinc diethyldithiocarbamate, zinc dibutyldithiocarbamate, zinc dibenzyldithiocarbamate, zinc pentamethylenedithiocarbamate, zinc dimethylpentamethylenedithiocarbamate, zinc ethylphenyldithiocarbamate, bismuth dimethyldithiocarbamate, cadmium diethyldithiocarbamate, cadmium pentamethylenedithiocarbamate, selenium dimethyldithiocarbamate, selenium diethyldithiocarbamate, tellurium dimethyldithiocarbamate, tellurium diethyldithiocarbamate, iron dimethyldithiocarbamate, copper dimethyldithiocarbamate, diethylammonium diethyldithiocarbamate, N,N-dicyclohexylammonium dibutyldithiocarbamate, piperidinium pentamethylenedithiocarbamate, cyclohexylethylammonium sodium cyclohexylethyldithiocarbamate, pipecolinium methylpentamethylenedithiocarbamate, and complex of zinc pentamethylenedithiocarbamate and piperidine.

(21) Salts of Xanthogenic Acid sodium isopropylxanthate, zinc isopropylxanthate, zinc butylxanthate, and disulfide dibutylxanthate.

(22) Esters of Acid Phosphoric Acid mono- or dimethyl phosphate, mono- or diethyl phosphate, mono- or dipropyl phosphate, mono- or dibutyl phosphate, mono- or dihexyl phosphate, mono- or dioctyl phosphate, mono- or didecyl phosphate, mono- or didodecyl phosphate, mono- or diphenyl phosphate, mono- or dibenzyl phosphate, and mono- or didecanol phosphate.

The compounds recited above are examples of the polymerization catalysts for polymerization curing the composition for optical materials of the present invention. However, the catalyst is not limited thereto as far as the compound is effective for curing the composition by polymerization. These catalysts may be used alone or in combination of two or more. The addition amount of the catalyst is 0.0001 to 10.0 parts by weight, preferably 0.0005 to 5.0 parts by weight based on 100 parts by weight of the composition for optical materials. An amount of the curing catalysts more than 10.0 parts by weight may reduce the refractive index and the heat resistance, discolor the cured product and present dangers of polymerization with violence.

The composition for optical materials of the present invention may be cured by polymerization in the presence of a compound reactable with part or all of the compounds (a) to (c) as a property improving additive to improve the oxidation resistance, weatherability, dyeability, strength, impact resistance and refractive index. A catalyst for polymerization curing may be added to the composition for the reaction with the property improving additive, if desired. Examples of the property improving additives are phenol compounds, alcohol compounds, carboxylic acids, carboxylic anhydrides, vinyl compounds including (meta)acrylates, (thio)epoxy compounds, monofunctionally terminated polybutenes, compounds having a mercapto group, inorganic compounds having a sulfur atom, and inorganic compounds having a selenium atom. These compounds may be added as much as necessary for obtaining the required properties as far as no adverse effect is produced.

To improve the practical properties of the optical materials being produced by polymerization-curing the composition of the present invention, the composition may be added with known additives such as antioxidants, ultraviolet light absorbents, anti-yellowing agents, bluing agents, color stabilizers and pigments. When the composition of the present invention is easy to separate from molds during polymerization, it is effective to use or add known external and/or internal adhesion improvers, thereby controlling and improving the adhesion between the cured material being formed and the mold. On the other hand, when the composition of the present invention is difficult to release from molds after the polymerization, it is effective to use or add a known external or internal mold release agent, thereby improving the releasability of the cured material being formed from the molds.

In the present invention, the main components (the composition containing the compounds (a), (b), and (c)) is uniformly mixed with the secondary components (catalyst, property improving additives, the additives such as the adhesion or mold release improver, antioxidants, ultraviolet absorbers, anti-yellowing agents, bluing agents, color stabilizers, and pigments). The resultant uniform mixture is cast into a mold made of glass or metal, cured by polymerization under heating, and then released from the mold to obtain the optical material.

The compounds (a), (b) and (c), property improving additives, catalyst and additives may be all blended simultaneously in the same container, or may be blended by adding each component stepwise. Alternatively, a few of the components are blended in separate containers and then blended together in the same container. The blending is carried out in a magnetic stirring mixer, a blade mixer, a kneader, a laboplastomill, a static mixer, a V-shape mixer or a RIM mixing head.

The mixing temperature and time are not critical as far as the components are sufficiently mixed. An excessively high temperature and an excessively long mixing time unfavorably make the casting operation difficult because undesirable reaction between the essential components and the optional components is induced to increase the viscosity. The mixing temperature is about −50 to 150° C., preferably −30 to 140° C., more preferably −5 to 140° C. The mixing time is 0.05 min to 24 h, preferably 0.1 s to 10 h, more preferably 1 s to 6 h.

The compound (a), the compound (b) the compound (c) and property improving additives may be all or partly prepolymerized in the presence or absence of the catalyst with or without stirring at −100 to 160° C. for 0.1 to 480 h, and then mixed with the secondary components. The prepolymerization is preferably conducted at −10 to 120° C. for 0.1 to 240 h, more preferably, at 0 to 100° C. for 0.1 to 120 h. The prepolymerization may be carried out, if necessary, in the presence of additives such as the adhesion or mold release improvers, antioxidants, ultraviolet absorbers, anti-yellowing agents, bluing agents, color stabilizers, and pigments.

The mixing of the pre-reacted main components with the secondary components is carried out in the same condition as above.

The degasification under reduced pressure prior to the mixing, during the mixing or after the mixing of the main components and the secondary components is preferred to prevent the generation of bubbles during the subsequent casting step and curing step by polymerization. The degree of evacuation is about 0.1 to 700 mmHg, preferably 0.5 to 300 mmHg. To increase the quality of the optical material of the invention, it is preferred to remove impurities by filtering the composition or the main or secondary components through a filter having a pore size of about 0.05 to 3 μm.

After casting the starting mixture into a glass or metal mold, the curing by polymerization is conducted using an electric furnace, a water bath or an oil bath. When casting into a glass or metal mold, the starting mixture may be cast into a mold from a mixer directly or through a syringe, a compression molding machine, an RIM molding machine or an injection molding machine. The curing time is 0.1 to 100 h, preferably 1 to 72 h. The curing temperature is −10 to 160° C., preferably 0 to 140° C. The polymerization is carried out by keeping the starting mixture at a given polymerization temperature for a given period of time while raising the temperature at 0.1 to 100° C./h, lowering the temperature at 0.1 to 100° C./h or using a combination thereof. After curing, it is preferred to anneal the optical material at 50 to 150° C. for 10 min to 5 h because the strain of the optical material can be removed. Where necessary, the obtained optical material may be subjected to surface treatments for dyeing, hard coat formation, reflection prevention and clouding prevention.

The optical materials produced by the manners described above have a high impact resistance enough to prevent the rupture by the iron ball of 500 g or more dropped from the height of 127 cm, a refractive index of 1.55 to 1.75 and an Abbe's number of 35 to 55.

The present invention will be described in more detail by reference to the following examples which should not be construed to limit the scope of the invention thereto. The evaluation of cured products was carried out in the following manners.

(1) Refractive Index (nD) and Abbe's Number (vD):
Measured at 25° C. using Abbe refractometer.

(2) Impact Resistance:
Iron balls of 500 g and 1000 g were dropped to a flat plate having a thickness of 2.5 mm from the height of 127 cm. The plate not broken was rated "good" and the plate broken was rated "poor".

EXAMPLE 1

A mixture consisting of 60 parts by weight of bis(β-epithiopropyl) sulfide, 20 parts by weight of 4,4′-methylenebis(cyclohexyl isocyanate) and 20 parts by weight of diethyltoluenediamine was deaerated, cast into a mold for flat lens of 2.5 mm thick and cured by polymerization in an oven by raising the temperature from 50° C. to 130° C. over 24 h to prepare a lens. The obtained lens was excellent in heat resistance and physical properties, and showed an excellent transparency and surface condition. The refractive index, the Abbe's number and the impact resistance are shown in Table 1.

EXAMPLE 2

In nitrogen atmosphere, 33 parts by weight of polyesterglycol having an average molecular weight of 1000 prepared from adipic acid and 1,6-hexanediol was reacted with 26 parts by weight of 4,4′-methylenebis(cyclohexyl isocyanate) at 130° C. for one hour to prepare an isocyanate-terminated polyurethane prepolymer, to which 30 parts by weight of bis(β-epithiopropyl) sulfide, 11 parts by weight of diethyltoluenediamine, 0.1 part by weight of tetrabutylphosphonium bromide and 0.02 part by weight of di-n-butyltin dilaurate were added at 70° C. under stirring. The resultant mixture was deaerated, cast into a mold for flat lens of 2.5 mm thick and cured by polymerization in an oven by raising the temperature from 50° C. to 130° C. over 24 h to prepare a lens. The prepared lens was excellent in heat resistance and physical properties, and showed an excellent transparency and surface condition. The refractive index, the Abbe's number and the impact resistance of the obtained lens are shown in Table 1.

EXAMPLES 3–10

The procedure of Example 2 was repeated except for using the chemical composition shown in Table 1. In any of the examples, the prepared lens was excellent in heat resistance and physical properties, and showed an excellent transparency and surface condition. The refractive index, the Abbe's number and the impact resistance of the obtained lens are shown in Table 1.

TABLE 1

| | | | | | | Evaluation Result | |
|---|---|---|---|---|---|---|---|
| | Chemical Composition (by weight) | | | | | | Impact Resistance |
| Ex. | (a) | (b) | (c) | others | nD | vD | 500 g | 1000 g |
| 1 | BES(60) | DETDA(20) | H12MDI(20) | | 1.63 | 37 | Good | Poor |
| 2 | BES(30) | DETDA(11) | A(59) | | 1.58 | 44 | Good | Good |
| 3 | BES(15) | DETDA(14) | B(71) | | 1.58 | 39 | Good | Good |
| 4 | BES(15) | DETDA(13) | B(66) | DMDS(6) | 1.59 | 38 | Good | Good |
| 5 | BES(20) | DETDA(3) | B(66) | DMDS(11) | 1.60 | 38 | Good | Good |
| 6 | BES(13) | DETDA(14) | B(68) | S(2) | 1.58 | 38 | Good | Good |
| 7 | BES(15) | DETDA(14) | C(71) | | 1.63 | 37 | Good | Good |
| 8 | BEDS(30) | AET(5) | A(65) | | 1.58 | 45 | Good | Good |

TABLE 1-continued

| | Chemical Composition (by weight) | | | | Evaluation Result | | | |
|---|---|---|---|---|---|---|---|---|
| | | | | | | | Impact Resistance | |
| Ex. | (a) | (b) | (c) | others | nD | vD | 500 g | 1000 g |
| 9 | BEDS(30) | ABT(9) | B(61) | | 1.62 | 37 | Good | Good |
| 10 | BEDS(41) | ABT(7) | C(52) | | 1.67 | 35 | Good | Good |

Note:
1. In Examples 1 to 10, 0.1 part by weight of tetrabutylphosphonium bromide and 0.02 part by weight of di-n-butyltin dilaurate were added.
2. Compound (a)
BES: bis(β-epithiopropyl) sulfide
BEDS: bis(β-epithiopropyl) disulfide
3. Compound (b)
DETDA: diethyltoluenediamine
AET: aminoethanethiol
ABT: aminobenzenethiol
4. Compound (c)
H12MDI: 4,4′-methylene bis(cyclohexyl isocyanate)
A: isocyanate-terminated polyurethane prepolymer prepared by reacting PEG (polyester glycol having an average molecular weight of 1000 derived from adipic acid and 1,6-hexanediol) and H12MDI in a weight ratio of 56/44 (OH/NCO = 1/3).
B: isocyanate-terminated polythiourethane prepolymer prepared by reacting the active hydrogen compound I (thiol-biterminated polythiourethane compound having a molecular weight of 1000 derived from di(mercaptoethyl) sulfide and hexamethylene diisocyanate) and H12MDI in a weight ratio of 56/44 (SH/NCO = 1/3).
C: isocyanate-terminated polythiourethane prepolymer prepared by reacting the active hydrogen compound II (HS—($CH_2$—S—)$_{21}$—SH) and H12MDI in a weight ratio of 56/44 (SH/NCO = 1/3).
5. Others
DMDS: di(mercaptoethyl) sulfide
S: Sulfur

COMPARATIVE EXAMPLE 1

A bisphenol A polycarbonate having an average molecular weight of 50000 was injection-molded into a flat plate of 2.5 mm thick. The refractive index, the Abbe's number and the impact resistance are shown in Table 2. The refractive index and Abbe's number of Comparative Example 1 were lower than those of Examples, and optical distortion was caused.

COMPARATIVE EXAMPLE 2

In nitrogen atmosphere, 100 parts by weight of bis(β-epithiopropyl) sulfide was mixed with 0.1 part by weight of tetrabutylphosphonium bromide under stirring. After deaerated, the mixture was cast into a mold for flat lens of 2.5 mm thick and cured by polymerization in an oven by raising the temperature from 30° C. to 100° C. over 20 h to prepare a lens. The prepared lens was excellent in heat resistance and physical properties, and shown an excellent transparency and surface condition. The refractive index, the Abbe's number and the impact resistance of the obtained lens are shown in Table 2. As compared with the Examples, the impact resistance was poor.

COMPARATIVE EXAMPLE 3

In nitrogen atmosphere, 36 parts by weight of 2,5-dimercaptomethyl-1,4-dithiane (DMMD), 18 parts by weight of pentaerythritol tetrakismercaptopropionate (PETMP), 46 parts by weight of 1,3-bis(isocyanatemethyl) cyclohexane (H6-XDI) and 0.01 part by weight of dimethyltin dichloride (DMTDCl) were mixed under stirring. After deaerated, the mixture was cast into a mold for flat lens of 2.5 mm thick and polymerized by heating in an oven at 50° C. for 10 h, at 60° C. for 5 h, and then at 120° C. for 3 h to prepare a lens. The prepared lens was excellent in heat resistance and physical properties, and showed an excellent transparency and surface condition. The refractive index, the Abbe's number and the impact resistance of the obtained lens are shown in Table 2. As compared with Examples, the impact resistance was poor.

TABLE 2

| | Chemical Composition | | | Impact Resistance | |
|---|---|---|---|---|---|
| Com. Ex. | (by weight) | nD | vD | 500 g | 1000 g |
| 1 | PC(100) | 1.58 | 29 | Good | Good |
| 2 | BES(99.9) TBPB(0.1) | 1.70 | 36 | Poor | Poor |
| 3 | DMMD(36) PETMP(18) H6-XDI(46) DMTDCl(0.01) | 1.60 | 40 | Poor | Poor |

Note:
PC: bisphenol A polycarbonate having an average molecular weight of 50000
BES: bis(β-epithiopropyl) sulfide
TBPB: tetrabutylphosphonium bromide
DMMD: 2,5-dimercaptomethyl-1,4-dithiane
PETMP: pentaerythritol tetrakismercaptopropionate
H6-XDI: 1,3-bis(isocyanatemethyl)cyclohexane
DMTDCl: dimethyltin dichloride

INDUSTRIAL APPLICABILITY

By curing the composition of the present invention by polymerization, a conventionally unknown optical material that has a higher strength as compared with polycarbonates and is balanced in the refractive index and the Abbe's number each higher than achieved by polycarbonates can be obtained.

What is claimed is:

1. A composition for optical materials comprising:
a compound having in one molecule at least one structure represented by the following formula (1):

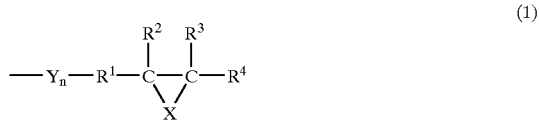

wherein $R^1$ is a single bond or a $C_1$–$C_{10}$ hydrocarbon group; each of $R^2$, $R^3$ and $R^4$ is a $C_1$–$C_{10}$ hydrocarbon group or hydrogen; X is S, O, Se or Te; Y is S, O, Se or Te; and n is an integer from 0 to 5;
an amine compound; and
an isocyanate-terminated urethane or thiourethane prepolymer.

2. The composition for optical materials according to claim 1, wherein the amine compound is at least one compound selected from the group consisting of:
compounds represented by the following formula (2):

wherein $R^5$ is a hydrocarbon group having 1 to 8 carbon atoms; a is an integer from 1 to 3; b is an integer from 0 to 2; and a+b is 3;
compounds represented by the following formula (3):

wherein $R^6$ is a hydrocarbon group having 1 to 8 carbon atoms; and c is an integer from 2 to 4;
compounds represented by the following formula (4):

wherein C is a mono- or divalent radical derived from a cycloalkane having 5 to 8 carbon atoms, a cycloalkene having 5 to 8 carbon atoms, a cycloalkadiene having 5 to 8 carbon atoms, norbornane, norbornene, norbornadiene, tricyclodecane, tricyclodecene, tricyclodecadiene, pentacyclopentadecane, or pentacyclopentadecadiene; A is —$NH_2$ or —$CH_2NH_2$; d is 1 or 2; provided that C may be substituted by one or two methyl or ethyl when A is —$NH_2$ and d is 2;
compounds represented by the following formula (5):

wherein Ar is a radical derived from benzene, naphthalene, anthracene or phenanthrene; A is —$NH_2$ or —$CH_2NH_2$; and e is 1 or 2; provided that Ar may be substituted by 1 to 4 substituents selected from methyl, ethyl, fluoro, chloro and bromo;
compounds represented by the following formula (6):

wherein $R^7$ is phenylene group or cyclohexylene group which may be substituted by 1 to 3 substituents selected from alkyl having 1 to 4 carbon atoms, chloro, bromo and iodo;
compounds represented by the following formula (7):

wherein $R^8$ is phenylene group or cyclohexylene group; B is —$NH_2$ when $R^8$ is phenylene or B is —$NH_2$ or —$R^9NH_2$ when $R^8$ is cyclohexylene group; and $R^9$ is alkylene group having 1 to 4 carbon atoms; provided that $R^8$ may be substituted by one or two alkyl groups having 1 to 4 carbon atoms;
(amino)(mercapto)-1,4-dithiane;
amino($C_2$–$C_6$ alkane)thiols;
aminomercaptopyridine;
aminofurfurylmercaptane;
aminomercaptothiazole; and
aminomercaptotriazole.

3. The composition for optical materials according to claim 2, wherein the amine compound has two or more amino groups.

4. The composition for optical materials according to claim 3, wherein the isocyanate-terminated urethane or thiourethane prepolymer has two or more isocyanate groups.

5. The composition for optical materials according to claim 4, comprising 0.5 to 90 parts by weight of the compound of Formula 1, 1 to 40 parts by weight of the amine compound and 10 to 90 parts by weight of the isocyanate-terminated urethane or thiourethane prepolymer.

6. A method for producing an optical material by curing the composition as defined in claim 5 by polymerization.

7. An optical material produced by the method according to claim 6.

8. An optical lens comprising the optical material according to claim 7.

9. The composition for optical materials according to claim 1, wherein the amine compound has two or more amino groups.

10. The composition for optical materials according to claim 1, wherein the isocyanate-terminated urethane or thiourethane prepolymer has two or more isocyanate groups.

11. The composition for optical materials according to claim 1, comprising 0.5 to 90 parts by weight of the compound of Formula 1, 1 to 40 parts by weight of the amine compound and 10 to 90 parts by weight of the isocyanate-terminated urethane or thiourethane prepolymer.

12. A method for producing an optical material by curing the composition as defined in claim 1 by polymerization.

13. An optical material produced by the method according to claim 12.

14. An optical lens comprising the optical material according to claim 13.

15. The composition for optical materials according to claim 1, wherein said isocyanate-terminated urethane or thiourethane prepolymer is a reaction product of an active hydrogen compound and an isocyanate compound.

16. The composition for optical materials according to claim 15, wherein said active hydrogen compound is selected from the group consisting of polyester polyol, polythioester polyol, polythioester, polythiol, polycaprolactone polyol, polycaprolactone polythiol, polyether polyol, polyether polythiol, polythioether polyol, polythioether polythiol, polycarbonate polyol, polycarbonate polythiol, polyurethane polyol, polyurethane polythiol, polythiourethane polythiol, bis(7-mercapto-2,5-dithiaheptylphenyl) sulfide, and polymercapto compound, each having a molecular weight of 400 to 5000.

* * * * *